(12) United States Patent
Contrada et al.

(10) Patent No.: US 9,840,049 B2
(45) Date of Patent: Dec. 12, 2017

(54) CELLULAR POLYMERIC MATERIAL

(71) Applicant: Berry Plastics Corporation, Evansville, IN (US)

(72) Inventors: Svetlana I Contrada, Manalapan, NJ (US); David Dezhou Sun, Evansville, IN (US); Abboud L Mamish, Marlborough, MA (US)

(73) Assignee: Berry Plastics Corporation, Evansville, IN (US)

( * ) Notice: Subject to any disclaimer, the term of this patent is extended or adjusted under 35 U.S.C. 154(b) by 579 days.

(21) Appl. No.: 14/108,110

(22) Filed: Dec. 16, 2013

(65) Prior Publication Data
US 2014/0167314 A1    Jun. 19, 2014

Related U.S. Application Data

(60) Provisional application No. 61/737,342, filed on Dec. 14, 2012.

(51) Int. Cl.

| | |
|---|---|
| *B29D 22/00* | (2006.01) |
| *B65D 65/38* | (2006.01) |
| *B65D 81/38* | (2006.01) |
| *B29C 47/92* | (2006.01) |
| *B29C 44/56* | (2006.01) |
| *C08L 23/12* | (2006.01) |
| *B29C 47/00* | (2006.01) |
| *B29K 23/00* | (2006.01) |
| *B29L 31/00* | (2006.01) |

(52) U.S. Cl.
CPC ............ *B29D 22/003* (2013.01); *B29C 44/56* (2013.01); *B29C 47/92* (2013.01); *B65D 65/38* (2013.01); *B65D 81/3816* (2013.01); *B65D 81/3867* (2013.01); *C08L 23/12* (2013.01); *B29C 47/0023* (2013.01); *B29C 2947/92219* (2013.01); *B29C 2947/92247* (2013.01); *B29C 2947/92295* (2013.01); *B29K 2023/12* (2013.01); *B29K 2995/004* (2013.01); *B29L 2031/7132* (2013.01)

(58) Field of Classification Search
CPC .................................................. B29D 22/003
See application file for complete search history.

(56) References Cited

U.S. PATENT DOCUMENTS

| | | | |
|---|---|---|---|
| 1,396,282 | A | 11/1921 | Penn |
| 1,435,120 | A | 11/1922 | Holman |
| 1,920,529 | A | 8/1933 | Sidebotham |

(Continued)

FOREIGN PATENT DOCUMENTS

| | | |
|---|---|---|
| BE | 898053 | 4/1984 |
| CA | 2291607 | 6/2000 |

(Continued)

OTHER PUBLICATIONS

Office Action for Chinese Patent Application No. 201380065116.7, dated Jun. 28, 2016, including English language summary, 12 pages.

(Continued)

*Primary Examiner* — Larry Thrower
(74) *Attorney, Agent, or Firm* — Barnes & Thornburg LLP

(57) ABSTRACT

A formulation includes a polymeric material and can be used to form an insulated container.

7 Claims, 7 Drawing Sheets

(56) References Cited

U.S. PATENT DOCUMENTS

| | | |
|---|---|---|
| 1,969,030 A | 8/1934 | Page |
| 2,097,899 A | 11/1937 | Smith |
| 2,809,776 A | 10/1957 | Barrington |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Gilbert |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,733,381 A | 5/1973 | Willette |
| 3,793,283 A | 2/1974 | Frailey |
| 3,846,349 A | 11/1974 | Harada |
| 3,907,193 A | 9/1975 | Heller |
| 3,919,368 A | 11/1975 | Seto |
| RE28,658 E | 12/1975 | Macdaniel |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,240,568 A | 12/1980 | Pool |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,490,130 A | 12/1984 | Konzal |
| 4,550,046 A | 10/1985 | Miller |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,878,970 A | 11/1989 | Schubert |
| 4,918,112 A | 4/1990 | Roox |
| 4,940,736 A | 7/1990 | Alteepping |
| 5,078,817 A | 1/1992 | Takagaki |
| 5,116,881 A | 5/1992 | Park |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |
| 5,308,568 A | 5/1994 | Lipp |
| 5,348,795 A | 9/1994 | Park |
| 5,366,791 A | 11/1994 | Carr |
| 5,385,260 A | 1/1995 | Gatcomb |
| 5,443,769 A | 8/1995 | Karabedian |
| 5,445,315 A | 8/1995 | Shelby |
| 5,490,631 A | 2/1996 | Iioka |
| 5,507,640 A | 4/1996 | Gilmer |
| 5,547,124 A | 8/1996 | Mueller |
| 5,549,864 A | 8/1996 | Greene |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,866,053 A | 2/1999 | Park |
| 5,868,309 A | 2/1999 | Sandstrom |
| 5,895,614 A | 4/1999 | Rivera |
| 5,925,450 A | 7/1999 | Karabedian |
| 5,928,741 A | 7/1999 | Andersen |
| 5,944,225 A | 8/1999 | Kawolics |
| 5,948,839 A | 9/1999 | Chatterjee |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,071,580 A | 6/2000 | Bland |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,174,930 B1 | 1/2001 | Agarwal |
| 6,193,098 B1 | 2/2001 | Mochizuki |
| 6,218,023 B1 | 4/2001 | DeNicola |
| 6,231,942 B1 | 5/2001 | Blizard |
| 6,235,380 B1 | 5/2001 | Tupil |
| 6,251,319 B1 | 6/2001 | Tusim |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,328,916 B1 | 12/2001 | Nishikawa |
| 6,376,059 B1 | 4/2002 | Anderson |
| 6,378,733 B1 | 4/2002 | Boonzaier |
| 6,379,802 B2 | 4/2002 | Ito |
| 6,383,425 B1 | 5/2002 | Wu |
| 6,420,024 B1 | 7/2002 | Perez |
| 6,444,073 B1 | 9/2002 | Reeves |
| 6,455,150 B1 | 9/2002 | Sheppard |
| 6,468,451 B1 | 10/2002 | Perez |
| 6,472,473 B1 | 10/2002 | Ansems |
| RE37,923 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |
| 6,811,843 B2 | 11/2004 | DeBraal |
| 6,814,253 B2 | 11/2004 | Wong |
| 6,875,826 B1 | 4/2005 | Huovinen |

(56) References Cited

U.S. PATENT DOCUMENTS

| | | |
|---|---|---|
| 6,883,677 B2 | 4/2005 | Goeking |
| 6,884,377 B1 | 4/2005 | Burnham |
| 6,884,851 B2 | 4/2005 | Gauthy |
| 6,908,651 B2 | 6/2005 | Watanabe |
| 6,926,507 B2 | 8/2005 | Cardona |
| 6,926,512 B2 | 8/2005 | Wu |
| 6,982,107 B1 | 1/2006 | Hennen |
| 7,056,563 B2 | 6/2006 | Halabisky |
| 7,070,852 B1 | 7/2006 | Reiners |
| 7,074,466 B2 | 7/2006 | DeBraal |
| 7,094,463 B2 | 8/2006 | Haas |
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Herbert |
| 7,281,650 B1 | 10/2007 | Milan |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,622,881 B2 | 11/2009 | Golownia et al. |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,404 B2 | 7/2010 | Burgun |
| 7,786,216 B2 | 8/2010 | Soediono |
| 7,787,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,906,588 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,922,971 B2 | 4/2011 | Robertson |
| 7,928,162 B2 | 4/2011 | Kiss |
| 7,928,176 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,234 B2 | 2/2012 | Weaver |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,404,780 B2 | 3/2013 | Weaver |
| 8,435,615 B2 | 5/2013 | Tsuchida |
| 8,679,620 B2 | 3/2014 | Matsushita |
| 8,715,449 B2 | 5/2014 | Leser |
| 8,721,823 B2 | 5/2014 | Vaideeswaran |
| 8,883,280 B2 | 11/2014 | Leser |
| 9,067,705 B2 | 6/2015 | Leser |
| 9,180,995 B2 | 11/2015 | Iyori |
| 9,358,772 B2 | 6/2016 | Leser |
| 2001/0010848 A1 | 8/2001 | Usui |
| 2001/0010849 A1 | 8/2001 | Blizard |
| 2001/0038893 A1 | 11/2001 | Mohan |
| 2001/0041236 A1 | 11/2001 | Usui |
| 2002/0030296 A1 | 3/2002 | Geddes |
| 2002/0041046 A1 | 4/2002 | Hartjes |
| 2002/0058126 A1 | 5/2002 | Kannankeril |
| 2002/0135088 A1 | 9/2002 | Harfmann |
| 2002/0137851 A1 | 9/2002 | Kim |
| 2002/0144769 A1 | 10/2002 | Debraal |
| 2002/0172818 A1 | 11/2002 | DeBraal |
| 2003/0003251 A1 | 1/2003 | DeBraal |
| 2003/0017284 A1 | 1/2003 | Watanabe |
| 2003/0021921 A1 | 1/2003 | DeBraal |
| 2003/0029876 A1 | 2/2003 | Giraud |
| 2003/0108695 A1 | 6/2003 | Freek |
| 2003/0138515 A1 | 7/2003 | Harfmann |
| 2003/0211310 A1 | 11/2003 | Haas |
| 2003/0228336 A1 | 12/2003 | Gervasio |
| 2003/0232210 A1 | 12/2003 | Haas |
| 2004/0013830 A1 | 1/2004 | Nonomura |
| 2004/0031714 A1 | 2/2004 | Hanson |
| 2004/0038018 A1 | 2/2004 | Anderson |
| 2004/0062885 A1 | 4/2004 | Imanari |
| 2004/0115418 A1 | 6/2004 | Anderson |
| 2004/0170814 A1 | 9/2004 | VanHandel |
| 2005/0003122 A1 | 1/2005 | DeBraal |
| 2005/0006449 A1 | 1/2005 | DAmato |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | JeffreyKrueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum, III |
| 2005/0236294 A1 | 10/2005 | Herbert |

(56) References Cited

U.S. PATENT DOCUMENTS

| | | |
|---|---|---|
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0094577 A1 | 5/2006 | Mannlein |
| 2006/0095151 A1 | 5/2006 | Mannlein |
| 2006/0108409 A1 | 5/2006 | Pyper |
| 2006/0135679 A1 | 6/2006 | Winowiecki |
| 2006/0135699 A1 | 6/2006 | Li |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | Shan |
| 2008/0020162 A1 | 1/2008 | Fackler |
| 2008/0045638 A1 | 2/2008 | Chapman |
| 2008/0118738 A1 | 5/2008 | Boyer |
| 2008/0121681 A1 | 5/2008 | Wiedmeyer |
| 2008/0138593 A1 | 6/2008 | Martinez |
| 2008/0156857 A1 | 7/2008 | Johnston |
| 2008/0177242 A1 | 7/2008 | Chang |
| 2008/0227877 A1 | 9/2008 | Stadlbauer |
| 2008/0234435 A1 | 9/2008 | Chang |
| 2008/0260996 A1 | 10/2008 | Heilman |
| 2008/0269388 A1 | 10/2008 | Markovich |
| 2008/0280517 A1 | 11/2008 | Chang |
| 2008/0281037 A1 | 11/2008 | Karjala |
| 2008/0311812 A1 | 12/2008 | Arriola |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0096130 A1 | 4/2009 | Jones |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0027569 A1 | 11/2009 | Weaver |
| 2009/0275690 A1 | 11/2009 | Weaver |
| 2009/0324914 A1 | 12/2009 | Lieng |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0116422 A1 | 5/2010 | Vaideeswaran |
| 2010/0137118 A1 | 6/2010 | Chang |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0240818 A1 | 9/2010 | Walton |
| 2010/0279571 A1 | 11/2010 | Poon |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |
| 2011/0318560 A1 | 12/2011 | Yun |
| 2012/0004087 A1 | 1/2012 | Tharayil |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wittner |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0032963 A1 | 2/2013 | Tokiwa |
| 2013/0052385 A1* | 2/2013 | Leser ............... C08J 9/0023 428/36.92 |
| 2013/0140320 A1 | 6/2013 | Nadella |
| 2013/0216744 A1 | 8/2013 | Liao |
| 2013/0280517 A1 | 10/2013 | Buehring |
| 2013/0303645 A1 | 11/2013 | Dix |
| 2014/0131430 A1 | 5/2014 | Leser |
| 2014/0263367 A1 | 9/2014 | Robertson |

(56) References Cited

U.S. PATENT DOCUMENTS

| | | |
|---|---|---|
| 2015/0250342 A1 | 9/2015 | Euler |
| 2015/0258771 A1 | 9/2015 | Leser |

FOREIGN PATENT DOCUMENTS

| | | |
|---|---|---|
| CA | 2765489 | 12/2010 |
| CN | 1288427 | 3/2001 |
| CN | 1495100 | 5/2004 |
| CN | 1942370 | 4/2007 |
| CN | 101370873 | 2/2009 |
| CN | 101429309 | 5/2009 |
| CN | 101531260 | 9/2009 |
| CN | 101538387 | 9/2009 |
| CN | 102089370 | 6/2011 |
| CN | 102115561 | 7/2011 |
| CN | 102245368 | 11/2011 |
| CN | 102391570 | 3/2012 |
| CN | 102762350 | 10/2012 |
| DE | 2831240 | 1/1980 |
| DE | 2831240 C | 3/1988 |
| DE | 102006025612 | 11/2007 |
| DE | 102006025612 A1 | 11/2007 |
| EP | 0001791 | 5/1979 |
| EP | 0086869 | 8/1983 |
| EP | 0161597 | 11/1985 |
| EP | 0318167 | 5/1989 |
| EP | 0520028 | 12/1992 |
| EP | 0570221 | 11/1993 |
| EP | 0588321 | 3/1994 |
| EP | 0659647 | 6/1995 |
| EP | 0879844 | 11/1998 |
| EP | 0972727 | 1/2000 |
| EP | 0796199 | 2/2001 |
| EP | 0940240 | 10/2002 |
| EP | 1308263 | 5/2003 |
| EP | 1323779 | 7/2003 |
| EP | 1479716 | 11/2004 |
| EP | 1666530 | 6/2006 |
| EP | 1754744 | 2/2007 |
| EP | 1921023 A1 | 5/2008 |
| EP | 1939099 | 7/2008 |
| EP | 2266894 | 12/2010 |
| EP | 2386584 A1 | 11/2011 |
| EP | 2386601 | 11/2011 |
| EP | 2720954 | 4/2014 |
| GB | 1078326 | 8/1967 |
| GB | 2485077 | 5/2012 |
| JP | 52123043 | 10/1977 |
| JP | 52123043 U | 10/1977 |
| JP | S5641146 A | 4/1981 |
| JP | 58029618 | 2/1983 |
| JP | H02129040 U | 5/1990 |
| JP | H02269683 | 11/1990 |
| JP | H0543967 | 6/1993 |
| JP | 0615751 | 1/1994 |
| JP | 3140847 | 1/1994 |
| JP | 06192460 | 7/1994 |
| JP | H08067758 | 3/1996 |
| JP | 2000128255 | 5/2000 |
| JP | P310847 | 12/2000 |
| JP | 2001310429 | 11/2001 |
| JP | 2001315277 | 11/2001 |
| JP | 2003292663 | 10/2003 |
| JP | 2003321566 | 11/2003 |
| JP | 2004018101 | 1/2004 |
| JP | 2004168421 | 6/2004 |
| JP | 2004168421 A | 6/2004 |
| JP | 2004330464 | 11/2004 |
| JP | 2005272542 | 10/2005 |
| JP | 2006096390 | 4/2006 |
| JP | 2006130814 A | 5/2006 |
| JP | 2006142008 A | 6/2006 |
| JP | 2007154172 | 6/2007 |
| JP | 2008162700 | 7/2008 |
| JP | 2009504858 | 2/2009 |
| JP | 2009066856 A | 4/2009 |
| JP | 2009126922 | 6/2009 |
| JP | 2009138029 | 6/2009 |
| JP | 2009190756 A | 8/2009 |
| JP | 2010173258 | 8/2010 |
| JP | 2011104890 | 6/2011 |
| KR | 100306320 | 10/2001 |
| KR | 2003036558 | 5/2003 |
| KR | 2004017234 | 2/2004 |
| KR | 101196666 | 11/2012 |
| TW | 393427 | 6/2000 |
| TW | M362648 | 8/2009 |
| TW | 201021747 | 6/2010 |
| WO | 9113933 | 9/1991 |
| WO | 1991013933 | 9/1991 |
| WO | 9413460 | 6/1994 |
| WO | 1994013460 | 6/1994 |
| WO | 9729150 | 8/1997 |
| WO | 1998016575 | 4/1998 |
| WO | 0002800 | 1/2000 |
| WO | 0119733 | 3/2001 |
| WO | 0132758 | 5/2001 |
| WO | 0153079 | 7/2001 |
| WO | 0234824 | 5/2002 |
| WO | 03076497 | 9/2003 |
| WO | 03099913 | 12/2003 |
| WO | 2004104075 | 12/2004 |
| WO | 2006042908 | 4/2006 |
| WO | 2006124369 | 11/2006 |
| WO | 2007003523 | 1/2007 |
| WO | 2007020074 | 2/2007 |
| WO | 2007068766 | 6/2007 |
| WO | 2007090845 A2 | 8/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008145267 | 12/2008 |
| WO | 2009035580 | 3/2009 |
| WO | 2010006272 | 1/2010 |
| WO | 2010019146 | 2/2010 |
| WO | 2010076701 A1 | 7/2010 |
| WO | 2010111869 | 10/2010 |
| WO | 2011005856 | 1/2011 |
| WO | 2011036272 | 3/2011 |
| WO | 2011036272 A2 | 3/2011 |
| WO | 2011038081 | 3/2011 |
| WO | 2011076637 | 6/2011 |
| WO | 2011141044 | 11/2011 |
| WO | 2011144705 | 11/2011 |
| WO | 2012020106 | 2/2012 |
| WO | 2012025584 | 3/2012 |
| WO | 2012044730 | 4/2012 |
| WO | 2012055797 | 5/2012 |
| WO | 2012099682 | 7/2012 |
| WO | 2012173873 | 12/2012 |
| WO | 2012174422 | 12/2012 |
| WO | 2012174567 | 12/2012 |
| WO | 2012174568 | 12/2012 |
| WO | 2013032552 | 3/2013 |
| WO | 2013101301 | 7/2013 |

OTHER PUBLICATIONS

Australian First Patent Examination Report for Application No. 2013334155, dated May 23, 2016, 4 pages.
Extended European Search Report for European Application No. 13862331.9-1708 /2931627 PCT/US2013/074923, dated Jul. 7, 2016.
English translation of Russian Office Action for Application Serial No. 2014101298, dated Jul. 22, 2016, 7 pages.
Taiwan Office Action for Taiwan Pat. App. No. 102146299, 7 pages.
Third Party Observation filed in European Patent App. No. 12727994.1, 11 pages.
International Standard ISO 16790:2005(E), 20 pages.
S. Muke et al., The Melt Extensibility of Polypropylene, Polym. Int. 2001, 515-523, 9 pages.

(56) References Cited

OTHER PUBLICATIONS

P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4, 4 pages.
British Examination Report for GB App. No. 1400762.9, 2 pages.
Chinese Office Action for Chinese Applicaiton 201380065781.6, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009.
Extended European Search Report for European App. No. 13863649.3, 9 pages.
Office Action dated Nov. 4, 2016 for U.S. Appl. No. 13/961,411.
Chinese Office Action for Chinese Application No. 201280051426.9, 9 pages.
English Summary of Chinese Office Action for Application Serial No. 201380041896.1, dated Nov. 11, 2016, 11 pages.
Extended European Search Report for European App. No. 14775300.8 sent Oct. 24 2016, 9 pages.
Office Action dated Nov. 18, 2016 for U.S. Appl. No. 14/718,836.
Office Action dated Oct. 7, 2016 for U.S. Appl. No. 14/739,510.
Japanese Office Action for Japanese Application No. 2014-515882, dispatched Aug. 30, 2016, 6 pages.
Mexican Office Action for Mexican Application MX/a/2013/014993, 6 pages.
New Zealand Examination Report for New Zealand Application No. 708552, 4 pages.
New Zealand First Examination Report for New Zealand Application 708546, 4 pages.
Russian Office Action for Russian Application No. 2014101298, 6 pages.
European Examination Report for European App. No. 12727994.1, 4 pages.
Chinese Office Action for Chinese App. No. 201380065089.3, 12 pages.
Chinese Office Action for Chinese App. No. 201380065127.5, 11 pages.
European Search Report for European App. No. 13849152.7, 3 pages.
Australian Patent Examination Report for Australian App. No. 2013334155 dated Oct. 24, 2016, 7 pages.
Spanish Search Report for Spanish App. No. 201490025, 5 pages.
Japanese Office Action for Japanese Patent App. 2014-516089 sent Dec. 20, 2016, 6 pages.
Office Action dated Sep. 1, 2016 for U.S. Appl. No. 14/106,212.
Australian First Patent Examination Report for Application No. 2013359097 sent Aug. 26, 2016, 3 pages.
British Examamination Report for GB Application No. GB1400762.9, dated Aug. 8, 2016, 2 pages.
Extended European Search Report for European Application No. 13863546.1 established Jul. 12, 2016, 7 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Office Action dated Sep. 27, 2016 for U.S. Appl. No. 14/725,316.
Japanese Office Action for Japanese App. No. 2014-528384, 15 pages.
Singapore Office Action and Written Opinion for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 sent Jan. 30, 2017, 3 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information—patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529, 6 pages.
Office Action dated Dec. 28, 2016 for U.S. Appl. No. 14/106,276.
Chinese Office Action for Chinese App. No. 201380065089.3, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Othce Action dated Apr. 7, 2017 for U.S. Appl. No. 14/063,252.
Chinese Office Action for Chinese Application No. 201380065127.5 sent Apr. 1, 2017, 14 pages.
Japanese Office Action for Japanese Application No. 2014-515882, dispatched Apr. 4, 2017, 6 pages.
New Zealand Examination Report for New Zealand Application No. 708552, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 dated Apr. 5, 2017, 12 pages.
Office Action dated Feb. 24, 2017 for U.S. Appl. No. 14/188,504.
Office Action dated Feb. 28, 2017 for U.S. Appl. 15/004,263.
Office Action dated Mar. 6, 2017 for U.S. Appl. No. 14/108,142.
Chinese Office Action for Chinese App. No. 201480052411.3 dated Feb. 28, 2017, 16 pages.
New Zealand First Examination Report for New Zealand Application 708546, 2 pages.
Singapore Office Action and Written Opinion dated Dec. 13, 2016 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action dated Mar. 10, 2017 for Chinese Patent Application 201480007369.3, 11 pages.
New Zealand Examination Report for New Zealanc Application No. 708463, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 dated Feb. 23, 2017, 6 pages.
European Search Report of Application No. 12861450.0, dated Nov. 21, 2014.
International Search Report dated Nov. 7, 2014, relating to International Application No. PCT/US2014/51508.
New Zealand First Examination Report for Application No. 621219 dated Nov. 17, 2014.
Third-Party Submission Under 37 CFR 1.290 filed on Dec. 9, 2014 in U.S. Appl. No. 14/063,252.
International Search Report and Written Opinion dated Jan. 19, 2015, relating to International Application No. PCT/US2014/059312.
International Search Report dated Jan. 19, 2015, relating to International Application No. PCT/US2014/059216.
Office Action dated Feb. 2, 2015 for U.S. Appl. No. 14/106,114.
Office Action dated Jan. 6, 2015 for Chinese Application No. 201280034350.9 (11 pages).

(56) References Cited

OTHER PUBLICATIONS

Office Action dated Jan. 9, 2015 for Chinese Application No. 201280035667.4 (22 pages).
Spanish Search Report of Application No. 201390099, dated Feb. 9, 2015.
Office Action dated Oct. 10, 2014 for U.S. Appl. No. 14/106,358.
Office Action dated Oct. 16, 2014 for U.S. Appl. No. 14/106,212.
New Zealand First Examination Report for Application No. 619616 dated Oct. 10, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jul. 3, 2014, relating to International Application No. PCT/US2014/025697.
Office action dated Apr. 11, 2014 for U.S. Appl. No. 13/526,417.
Office Action dated Aug. 19, 2014 for Chinese Application No. 201280035667.4.
Office Action dated Aug. 21, 2014 for U.S. Appl. No. 13/526,454.
Office Action dated Jul. 25, 2014 for U.S. Appl. No. 13/525,640.
Office Action dated Sep. 25, 2014 for U.S. Appl. No. 13/526,417.
International Search Report dated Jul. 29, 2013, relating to International Application No. PCT/US2012/043016, 25 pages.
International Search Report and Written Opinion dated Sep. 17, 2013, relating to International Application No. PCT/US2012/041395.
Borealis AG, DAPLOY™ HMS Polypropylene for Foam Extrusion, 2010, 20 pages.
International Search Report dated Feb. 26, 2013, relating to International Application No. PCT/US2012/043018.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 30, 2012, relating to International Application No. PCT/US2012/041397.
International Search Report dated Nov. 19, 2012, relating to International Application No. PCT/US2012/041395.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of JP 2006-130814.
International Search Report dated Mar. 11, 2014, relating to International Application No. PCT/US2013/66811.
Machine English translation of EP0086869.
Singapore Office Action dated Dec. 18, 2014 for Singapore Application No. 2014002273.
Third-Party Submission Under 37 CFR 1.290 filed Feb. 26, 2015 in U.S. Appl. No. 13/491,007.
Certified English translation of EP0086869.
Office Action dated Apr. 30, 2015 for U.S. Appl. No. 14/462,073.
Office Action dated Apr. 14, 2015 for U.S. Appl. No. 14/106,212.
Office Action dated Apr. 10, 2015 for U.S. Appl. No. 14/106,358.
English translation of Spanish Search Report of Application No. 201490025, dated Apr. 20, 2015.
Spanish Search Report for Application No. 201490025, dated Apr. 20, 2015.
Office Action dated Jun. 23, 2015 for U.S. Appl. No. 13/525,640.
Third Party Submission Under 37 CFR 1.290 in U.S. Appl No. 14/188,504 submitted May 11, 2015 and May 27, 2015 (43 pages).
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
Wang et al., "Extending PP\s Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Office Action dated May 19, 2015 for Chinese Application No. 201280035667.4.
Office Action Chinese Patent Application No. 201280051426.9 dated Jul. 23, 2015.
Office Action dated Aug. 27, 2015 for U.S. Appl. No. 14/106,358.
Office Action dated Aug. 18, 2015 for U.S. Appl. No. 14/106,212.
Certified English translation of JP2003292663.
Office Action dated Oct. 8, 2015 for U.S. Appl. No. 14/188,504.
Second Chinese Office Action dated Sep. 6, 2015 for Chinese Application Serial No. 201280034350.9.
Office Action dated Oct. 27, 2015 for U.S. Appl. No. 14/462,073.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
English translation of Russian Office Action for Application Serial No. 2015127677, dated Sep. 16, 2015.
Inter Partes Review Petition for U.S. Pat. No. 8,883,280 (712 pages) [Reference submitted in three parts].
Borealis webpage dated Jan. 20, 2010 from Internet Archive (6 pages).
Gibson and Ashby, Cellular solids: structure and properties, 2nd ed., Cambridge University Press (1997) (7 pages).
C. Maier and T. Calafut, Polypropylene: the Definitive User\s Guide and Databook, Plastics Design Library, William Andrew Inc. (1998) (19 pages).
Reichelt et al., Cellular Polymers, vol. 22, No. 5 (2003) (14 pages).
Ratzsch et al., Prog. Polym. Sci., 27 (2002), 1195-1282 (88 pages).
Encyclopedia of Polymer Science and Technology: Plastics, Resins, Rubbers, and Fibers, vol. 2, John Wiley & Sons, Inc. (1965) (37 pages).
Shau-Tarng Lee, Chul B. Park, and N.S. Ramesh, Polymer Foams: Science and Technology, CRC Press (2007) (51 pages).
Grant & Hackh\s Chemical Dictionary, 5th ed., McGraw-Hill, Inc. (1987) (3 pages).
Merriam-Webster\s Collegiate Dictionary, 11th ed. (2003), p. 70 (3 pages).
Merriam-Webster\s Collegiate Dictionary, 11th ed. (2003), p. 1237 (3 pages).
Hawley\s Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournls.com/journals.asp?Page=111&JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly HMS Polypropylenefor Foam Extrusion" obtained from Borealis webpage obtained from the Internet Archive\s "Wayback Machine" as of Nov. 16, 2008 (https://web.archive.org/web/20081116085125/http://www.borealisgroup.com/pdf/literature/borealis-borouge/brochure/K$_{IN0020}$_GB_FF_2007_10_BB.pdf) ("Brochure \08") (20 pages).
Office Action dated Dec. 31, 2015 for U.S. Appl. No. 14/755,546.
Notice of Allowance dated Jan. 29, 2016 for U.S. Appl. No. 14/755,546.
English translation of First Office Action for Taiwanese Application No. 101121656, Nov. 13, 2015.
Singapore Notice of Eligibility for Grant, Search Report, and Examination Report transmitted Dec. 10, 2015 for Singapore Application No. 11201503336V.
Office Action dated Jan. 11, 2016 for U.S. Appl. No. 14/161,328.

(56) References Cited

OTHER PUBLICATIONS

English Summary of Russian Office Action for Application Serial No. 2014111340, dated Feb. 25, 2016, 8 pages.
United Kingdom Examination Report for Patent Application No. GB1400762.9 dated Feb. 11, 2016.
Office Action dated Feb. 16, 2016 for U.S. Appl. No. 14/108,142.
Extended European Search Report for European Application No. 13849152.7-1303 / 2912142 PCT/US2013/066811, dated Feb. 12, 2016.
English summary of Spanish Office Action for Application Serial No. P201490025, dated Feb. 9, 2016, 8 pages.
Supplemental European Search Report for European Application No. 12727994.1-1302, dated Feb. 17, 2016.
International Search Report and Written Opinion dated Oct. 18, 2013, relating to International Application No. PCT/US2013/053935.
International Preliminary Report on Patentability dated Feb. 16, 2016, relating to International Application No. PCT/US2014/051508.
English Summary of Chinese Office Action for Application Serial No. 201380041896.1, dated Mar. 21, 7 pages.
Extended European Search Report for European Application No. 13827981.5-1708 / 2888092 PCT/US2013/053935, dated Feb. 19, 2016.
Australian First Patent Examination Report for Application No. 2012271047, dated Feb. 29, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
Australian Second Patent Examination Report for Application No. 2012302251, dated Feb. 26, 2016.
English summary of Chinese Office Action for Chinese Application Serial No. 201380065781.6, dated Apr. 19, 2016, 14 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daployhmspp-extruded-foam/).
Reichelt et al., "PP-Blends with Tailored Foamability and Mechanical Properties", Cellular Polymers, vol. 22, No. 5, 2003, 14 pages.
Ratzsch et al., "Radical reactions on polypropylene in the solid state", Prog. Polym. Sci. 27 (2002) 1195-1282, 88 pages.
Excerpts from Encyclopedia of Polymer Science and Technology: Plastics, Resins, Rubbers, and Fibers, "Blowing Agents", vol. 2, John Wiley & Sons, Inc. (1965), 37 pages.
Excerpts from Polymer Foams: Science and Technology, Lee et al., "Introduction to Polymeric Foams", CRC Press (2007) 51 pages.
"Daploy(TM) HMS Polypropylene for Foam Extrusion", obtained from Borealis webpage obtained from the Internet Archive\s "Wayback Machine" as of Nov. 16, 2008 https://web.archive.org/web/20081116085125/http://www.borealisgroup.com/pdf/literature/borealisborouge/brochure/K_IN0020_GB_FF_2007_10_BB.pdf).
Excerpts from Gibson and Ashby, Cellular solids: Structure and properties—Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
ASTM D3763-86, an American Society for Testing of Materials (ASTM), "Standard Method for High-Speed Puncture Properties of Plastics Using Load and Displacement Sensors" (1986 Edition), 5 pages.
ASTM D1922-93, an American Society for Testing of Materials (ASTM), "Standard Method for Propagation Tear Resistance of Plastic Film and Thin Sheeting by Pendulum Method" (1993 Edition), 5 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., "Applicability of the Transient Plane Source Method to Measure the Thermal Conductivity of Low-Density Polyethylene Foams", Journal of Polymer Science: Part B: Polymer Physics, vol. 42 (2004), 1226-1234.
The Burn Foundation, "Scald Burns", available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
"Power of a Microwave Oven", available at https://web.archive.org/web/20071010183358/http://hypertextbook.com/facts/2007/TatyanaNektalova.shtml, dated Oct. 10, 2007, accessed on Feb. 5, 2016.
Health Physics Society, "Microwave Oven Q & A", available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., "Heat Transfer in Polypropylene-Based Foams ProducedUsing Different Foaming Processes", Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.G. McCrum et al., Principles of Polymer Engineering, 2nd ed., Oxford Science Publications (1997).
Excerpts from Robert H. Perry, Perry\s Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
Borealis Product Brochure, Daploy HMS Polypropylene for Foam Extrusion (2010), 20 pages.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci, 38 (1998), 1171-1176.
M. Antunes et al.,"Heat Transfer in Polyolefin Foams," Heat Transfer in Multi-Phase Materials, A. Öchsner and G. E. Murch, Eds. Springer-Verlag Berlin Heidelberg, 2011, 131-161.
Inter Partes Review Petition for U.S. Pat. No. 8,883,280 (2101 pages) [Submitted in multiple parts—section 1].

(56) References Cited

OTHER PUBLICATIONS

Inter Partes Review Petition for U.S. Pat. No. 8,883,280 (2101 pages.) [Submitted in multiple parts—section 2].
Inter Partes Review Petition for U.S. Pat. No. 8,883,280 (2101 pages.) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, Apr. 27, 2016, 5 pages.
Japanese Office Action for Japanese Patent Application No. 2014-528384, dated Mar. 1, 2016.
English Summary of Chinese Office Action for Application Serial No. 201380041896.1, dated Mar. 18, 2016, 7 pages.
Doerpinghaus et al., "Separating the effects of sparse long-chain branching on rheology from those due to molecular weight in polyethylenes", Journal of Rheology, 47, 717 (2003).
English Summary of Chinese Office Action for Application Serial No. 201280051426.9, dated Apr. 29, 2016, 5 pages.
English translation of Japanese Office Action for Japanese Application No. 2014-516089, dated May 10, 2016.
Third Party Submission Under 37 CFR 1.290 filed on May 12, 2016 in U.S. Appl. No. 14/739,510.
Daploy HMS Polypropylene for Foam Extrusion, 20 pages, Borealis Borouge Shaping the Future with Plastics, Published 2010, www.borealisgroup.com, www.borouge.com, Vienna, Austria.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written Opinion dated May 27, 2016 for Singapore Application No. 11201504327V.
Office Action dated Jun. 10, 2016 for U.S. Appl. No. 14/188,504.
Office Action dated Mar. 10, 2016 for U.S. Appl. No. 14/620,073.
Notice of Acceptance dated Jun. 10, 2016 for Australian Application No. 2012302251.
Office Action dated Jun. 7, 2017 for U.S. Appl. No. 15/388,319; (pp. 1-21).
Chinese Office Action for Chinese Application No. 201280051426.9 dated May 15, 2017, 12 pages.
Chinese Office Action for Chinese App. No. 201380041896.1 dated May 22, 2017, 9 pages.
Taiwan Office Action for Taiwan App. No. 101121655 dated Jun. 14, 2017, 29 pages.
Australian Examiner's Report for Australian App. No. 2014244210 dated Jun. 16, 2017, 4 pages.
European Examination Report for European App. No. 13863308.6 dated May 17, 2017, 3 pages.
Extended European Search Report for European App. No. 14836418.5 dated Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 dated Jun. 6, 2017, 19 pages.

* cited by examiner

CELLULAR POLYMERIC MATERIAL

PRIORITY CLAIM

This application claims priority under 35 U.S.C. §119(e) to U.S. Provisional Application Ser. No. 61/737,342, filed Dec. 14, 2012, which is expressly incorporated by reference herein.

BACKGROUND

The present disclosure relates to polymeric materials that can be formed to produce a container, in particular polymeric materials that insulate. More particular, the present disclosure relates to morphology and crystalline structure of cellular polymeric material that can be transformed into usable articles, such as insulated containers.

SUMMARY

An insulated container in accordance with the present disclosure is manufactured from a sheet extrudate or tubular extrudate produced in an extrusion process. In illustrative embodiments, the extrudate is a cellular polymeric material and the insulated container is later formed to provide a drink cup, a food-storage, cup, or a container.

In illustrative embodiments, an insulative container in accordance with the present disclosure is manufactured from a tubular extrudate produced in an extrusion process. In illustrative embodiments, the extrudate in an insulative cellular polypropylene-based material configured to provide resistance to creasing and/or wrinkling during cup convolution or shaping.

In illustrative embodiments, an extruded tube of insulative cellular polypropylene-based material has an inside-of-extruded-tube (InET) surface/layer and an outside-of-extruded-tube (OET) surface/layer that can be sliced to provide a strip of insulative cellular polypropylene-based material. An extruded tube of insulative cellular polypropylene-based material in accordance with the present disclosure has a surface morphology that includes a beta-crystalline polypropylene phase identified by X-ray wide angle diffraction analysis, which phase is not observable by differential scanning calorimetry (DSC).

In illustrative embodiments, the surface morphology of an extruded tube of insulative cellular polypropylene-based material in accordance with the present disclosure has a profound effect on the quality of an article, such as an insulative cup, formed therewith. In particular, the specific crystalline structure of the extruded tube surface/layer (InET or OET) facing inside of the insulative cup is directly related to a reduction in, if not an elimination of, visible deep creases and/or wrinkles inside the formed insulative cup.

In illustrative embodiments, a surface quality exists for a sheet of insulative cellular polypropylene-based material in accordance with the present disclosure that leads to a noticeable crease-free surface in an insulative cup prepared at a specified formulation, and under specified processing and forming conditions. In particular, such surface quality is determined by the properties of the crystalline phases of the polypropylene-based material. More particularly, such surface quality is determined by the relative size and the relative amounts of both the alpha- and beta-crystalline phases present in the polypropylene-based material.

In illustrative embodiments, a cup-forming process in accordance with the present disclosure provides an insulative cup. The cup-forming process also minimizes wrinkling and/or creasing includes the step of arranging in a cross-web direction (CD) the shape to be cut from an extruded tube of insulative cellular polypropylene-based mate with the OET surface/layer facing the inside of the cup.

In illustrative embodiments, creasing and/or wrinkling of insulative cellular polypropylene-based material having a fixed chemical composition, and made under controlled extrusion process conditions with controlled processing parameters, can essentially be eliminated if die cut parts are oriented in a CD direction. As a result, a cell aspect ratio close to 1 and a coefficient of anisotropy close to 1 is provided. In illustrative embodiments, performance of an extruded sheet of insulative cellular polypropylene-based material in accordance with the present disclosure can be a function of alpha and beta crystal domain size and relative content of beta phase as determined by K-value.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

B=conventional cellular polypropylene material with no beta-crystalline phase peak present at 16.1°.

DETAILED DESCRIPTION

Figure 1:
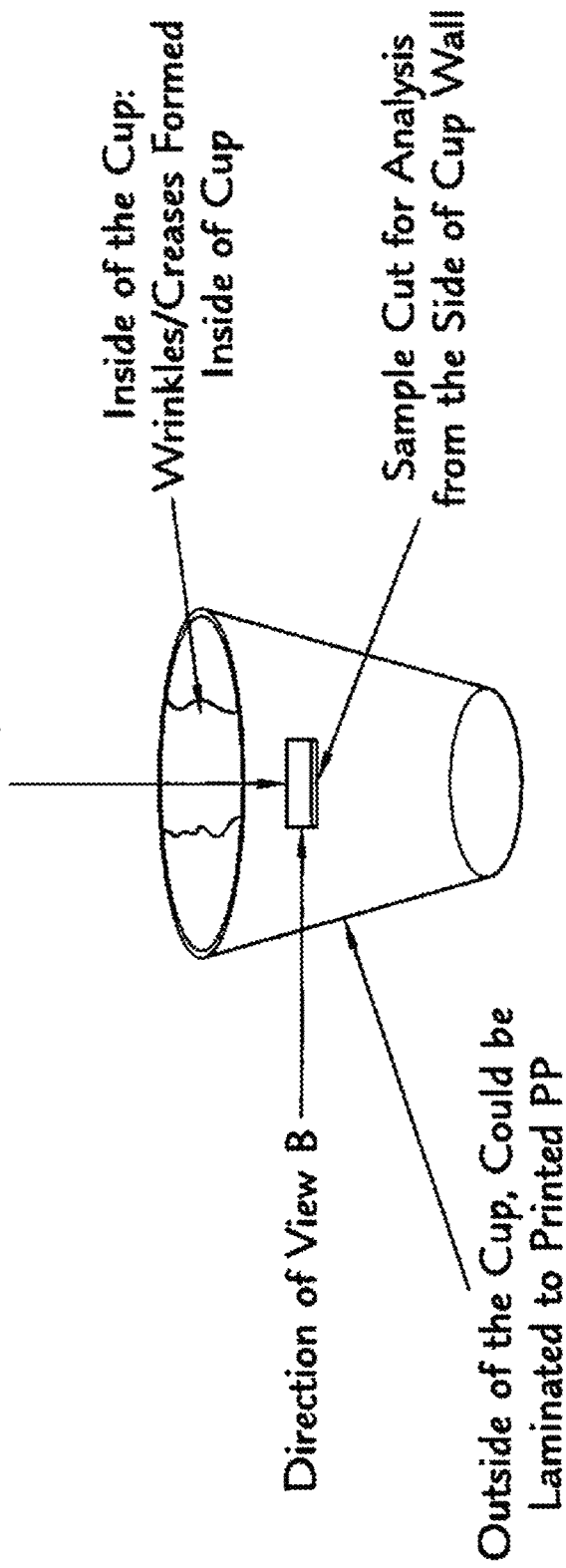
FIG. 1 illustrates sampling for microscopy and X-Ray analysis for which samples were cut from the side of an insulative cup side wall and analyzed in two perpendicular directions: View A from top to bottom of the cup and view B looking sideways.
Figure 2:
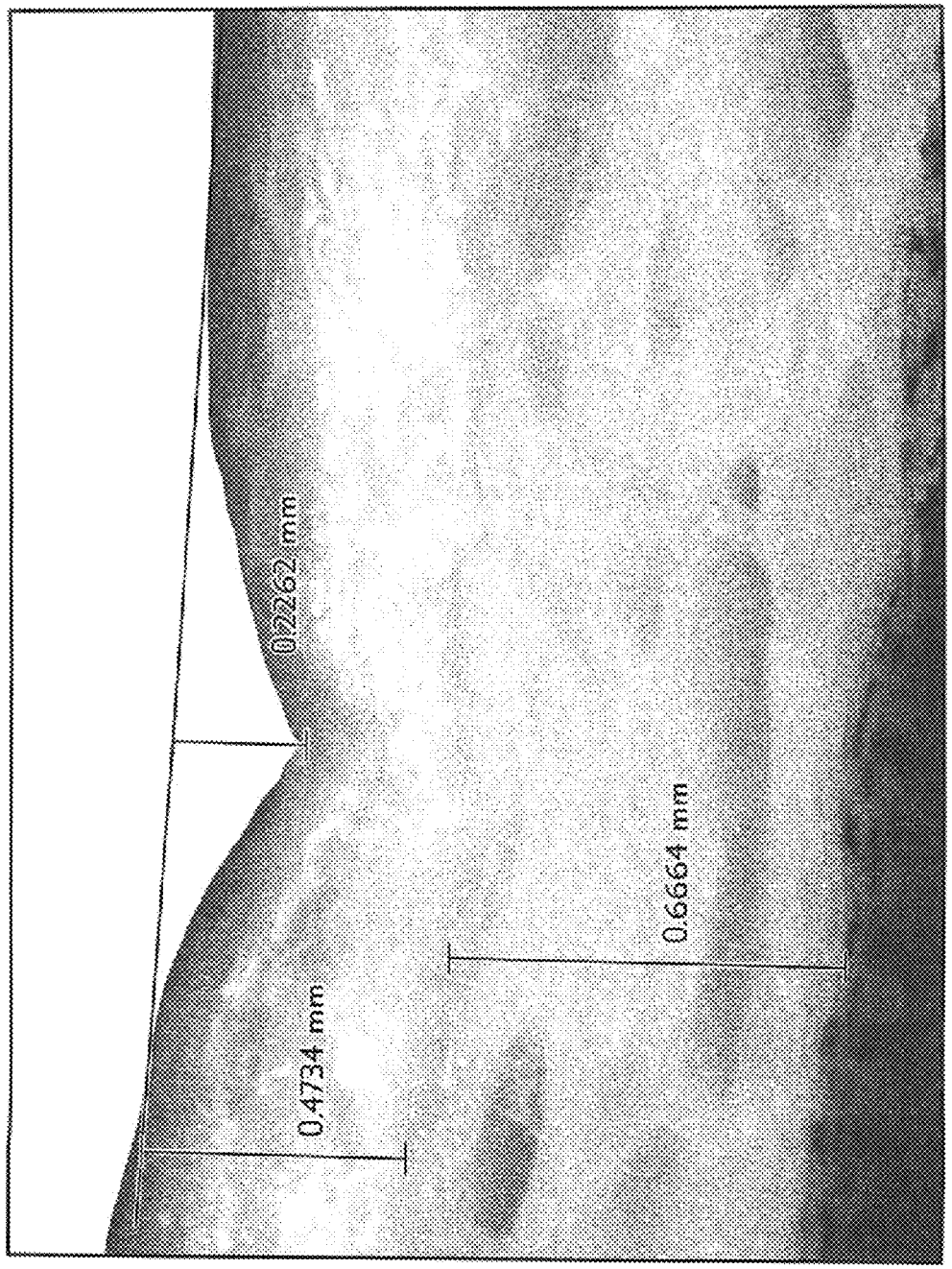
FIG. 2 shows a View A microscopy image of the insulative cup side wall from the cup of Example 5 (with printed film laminated to the foam), where OET is outside of the insulative cup, illustrating that the insulative cup side wall collapsed in compression during cup formation leading to crease formation with crease depth of 0.23 mm.

An insulated container in accordance with the present disclosure is manufactured from a sheet of insulative cellular non-aromatic polymeric material produced in an extrusion process. The sheet of insulative cellular non-aromatic polymeric material is then formed to provide an insulative cup or container which may be used as a drink cup or a food-storage cup as suggested in FIG. 1. The insulative cellular non-aromatic polymeric material of the present disclosure is an insulative cellular polypropylene-based material that is configured to provide resistance to creasing and/or wrinkling during cup convolution, shaping, or forming. FIGS. 2-6 are a series of views showing support for various theories explaining how material of the present disclosure is able to resist creasing and/or wrinkling during cup convoluting, shaping, and forming.

In exemplary embodiments, a tube of extruded insulative cellular polypropylene-based material in accordance with the present disclosure has two surfaces that are formed under different cooling conditions when the material is extruded. One surface, referred to herein as the outside-of-extruded-tube (OET) surface, is in contact with air, and does not have physical barriers restricting expansion. The OET surface is cooled by blowing compressed air at cooling rate equal or higher than 12° F. per second. The surface on the opposite side of an extruded tube of insulative cellular polypropylene-based material is referred to herein as the inside-of-extruded-tube (InET) surface. The InET surface is formed when the extruded tube is drawn in the web or machine direction on a metal cooling surface of a torpedo mandrel that is physically restricting the inside of the extruded tube and is cooled by combination of water and compressed air at a cooling rate below 10° F. per second. In exemplary embodiments, the cooling water temperature is about 135° F. (57.22° C.). In other exemplary embodiments, the cooling air temperature is about 85° F. (29.44° C.). As a result of different cooling mechanisms and/or rates, the OET and InET surfaces have different surface characteristics. Cooling rate and method affects the crystallization process of polypropylene thereby altering its morphology (size of crystal domains) and topography (surface profile).

An unexpected feature of exemplary embodiments of an extruded sheet of insulative cellular polypropylene-based material as described herein is the ability of the sheet to form a noticeably crease-free and wrinkle-free surface when curved to form a round article, such as an insulative cup. The surface is wrinkle-free even inside the cup, where compression forces typically cause material to crush and/or crease easily, especially for low density material with large cell size. In exemplary embodiments, the surface profile of an extruded sheet of insulative cellular polypropylene-based material as detected by microscopy is such that the depth of the indentations (i.e., creases and/or wrinkles) naturally occurring in the outside and inside of the cup surface when it is subject to extension and compression forces during cup forming may be less than about 100 microns. In one exemplary embodiment, the surface profile may be less than about 50 microns. In one exemplary embodiment, the surface profile may be about 5 microns or less. At a depth of about 10 microns and less, the micro-wrinkles on a cup surface are ordinarily not visible to the naked eye.

In one exemplary embodiment, an insulative cup formed from a sheet comprising a skin and a strip of insulative cellular polypropylene-based material had typical creases (i.e., deep wrinkles) about 200 microns deep extending from a top of the cup to a bottom of the cup. In one exemplary embodiment, an insulative cup formed from a sheet comprising a strip of insulative cellular polypropylene-based material only (without a skin) had typical creases about 200 microns deep extending from a top of the cup to a bottom of the cup. Such creases with depths from about 100 microns to about 500 microns are typically formed when InET is facing inside of the cup in a compression mode. Creases and deep wrinkles may present a problem of unsatisfactory surface quality making final cups unusable or undesirable. Creases may form in instances where sheets include a skin or exclude a skin.

In exemplary embodiments, the insulative cellular polypropylene-based material may be extruded as strip. However microscopy images show that two distinct layers exist within the extruded strip, namely, a dull OET layer and shiny InET layer. The difference between the two layers is in reflectance of the surface due to the difference in crystal domain size. If a black marker is used to color the surface examined by microscopy, reflectance is eliminated and the difference between the two surfaces may be minimal or undetectable. In one exemplary embodiment, a sample strip of insulative cellular polypropylene-based material was prepared without any skin Black marker was used to eliminate any difference in reflectance between the layers. Images showed that the cell size and cell distribution was the same throughout the strip thickness.

Differential scanning calorimetry (DSC) analysis conducted on a TA Instruments DSC 2910 in nitrogen atmosphere showed that with an increase in cooling rate, the crystallization temperature and crystallinity degree decreased for the insulative cellular polypropylene-based polymer matrix of the strip, as shown below in Table 1.

TABLE 1

| Crystallization of polymer matrix | | | | | |
|---|---|---|---|---|---|
| Crystallization temp, in ° C. | | | Crystallinity degree, in % | | |
| Slower cooling 5° C./min | 10° C./min | Faster cooling 15° C./min | Slower cooling 5° C./min | 10° C./min | Faster cooling 15° C./min |
| 135.3 | 131.5 | 129.0 | 49.2 | 48.2 | 47.4 |
| Melting (2$^{nd}$ heat) of polymer matrix (heating rate 10° C./min) after crystallization | | | | | |
| Melting temp, ° C. | | | Crystallinity degree, % | | |
| Slower cooling 5° C./min | 10° C./min | Faster cooling 15° C./min | Slower cooling 5° C./min | 10° C./min | Faster cooling 15° C./min |
| 162.3 | 162.1 | 161.8 | 48.7 | 47.2 | 46.9 |

Differential scanning calorimetry data thus demonstrates the dependence of crystallization temperature, subsequent 2$^{nd}$ heat melting temperature, and percent crystallinity on the rate of cooling during crystallization. Exemplary embodiments of a strip of insulative cellular polypropylene-based material may have a melting temperature between about 160° C. (320° F.) and about 172° C. (341.6° F.), a crystallization temperature between about 108° C. (226.4° F.) and about 135° C. (275° F.), and a percent crystallinity between about 42% and about 62%.

In an illustrative embodiment, a method of producing a wrinkle-resistant polymeric container includes cutting a shape in a cross-web direction (CD) from the extruded tube, wherein an outside-of-extruded-tube (OET) surface or layer faces the inside of the container. In an embodiment, a method of producing a wrinkle-resistant polymeric container includes providing an extruded tube of a resin mixture comprising a primary polypropylene resin and cutting a shape in a cross-web direction (CD) from the extruded tube, wherein an outside-of-extruded-tube (OET) surface or layer faces the inside of the container. In an embodiment, a crystal domain size of alpha-phase polypropylene as determined by wide angle X-Ray diffraction is below 100 Å. In an embodiment, a crystal domain size of beta-phase polypropylene as determined by wide angle X-Ray diffraction is above 190 Å.

In exemplary embodiments, an extruded sheet of insulative cellular polypropylene-based material had a melting temperature of about 162° C. (323.6° F.), a crystallization temperature of about 131° C. (267.8° F.) and a crystallinity degree of about 46% as determined by differential scanning calorimetry at 10° C. per minute heating and cooling rate.

Figure 5A:
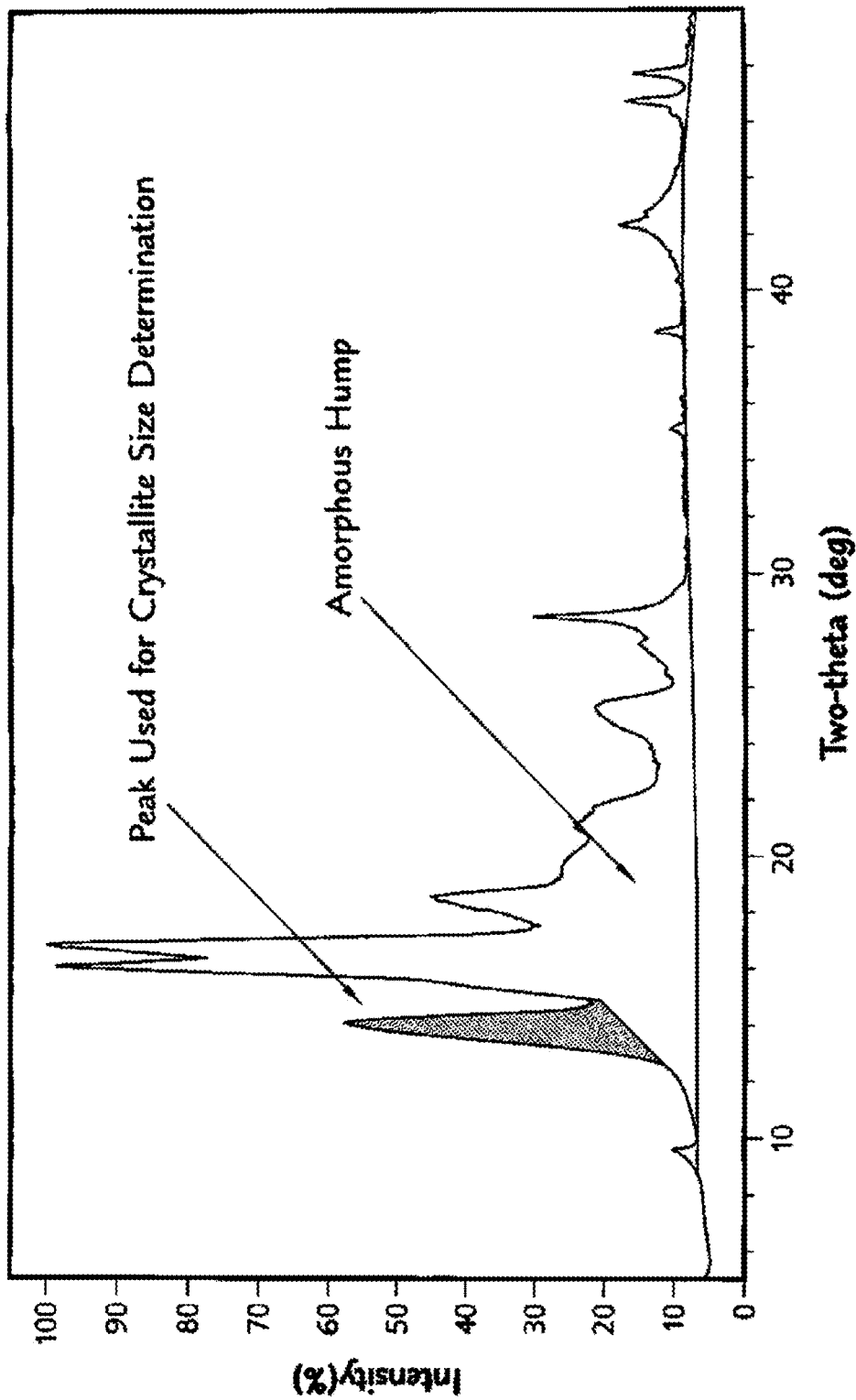
FIG. 5A shows the wide angle X-ray diffraction (WAXD) pattern for an OET surface sample from the sheet of insulative cellular polypropylene-based material used in Examples 1-5 having a crystalline size of 99 Å and percent crystallinity of 57.8%.
Figure 5B:
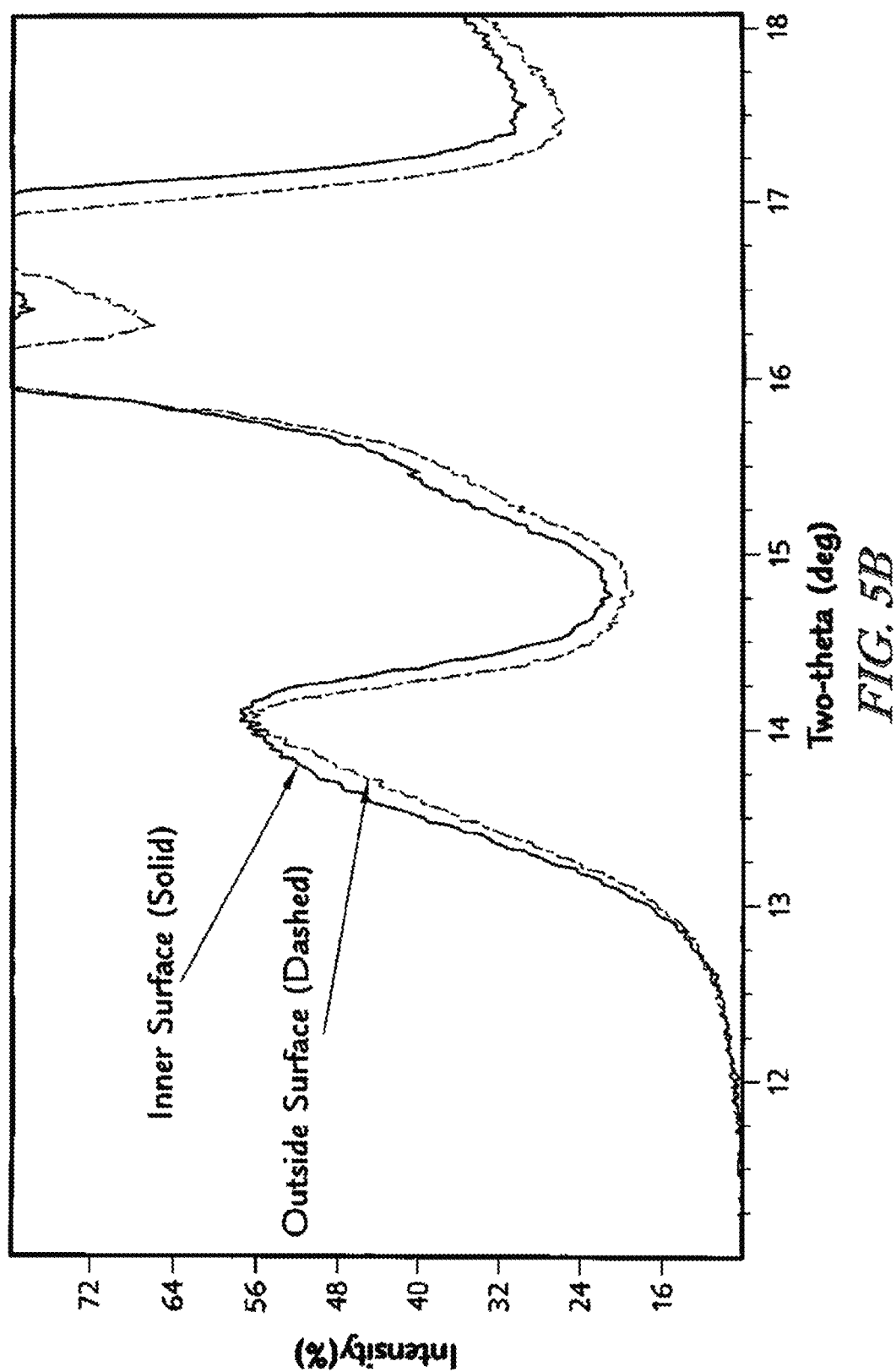
FIG. 5B shows a comparison of the WAXD patterns for the InET and OET surfaces of the sheet of insulative cellular polypropylene-based material used in Examples 1-5 illustrating the OET with a smaller crystal domain size than the InET and with beta-crystalline phase present.
Figure 6:
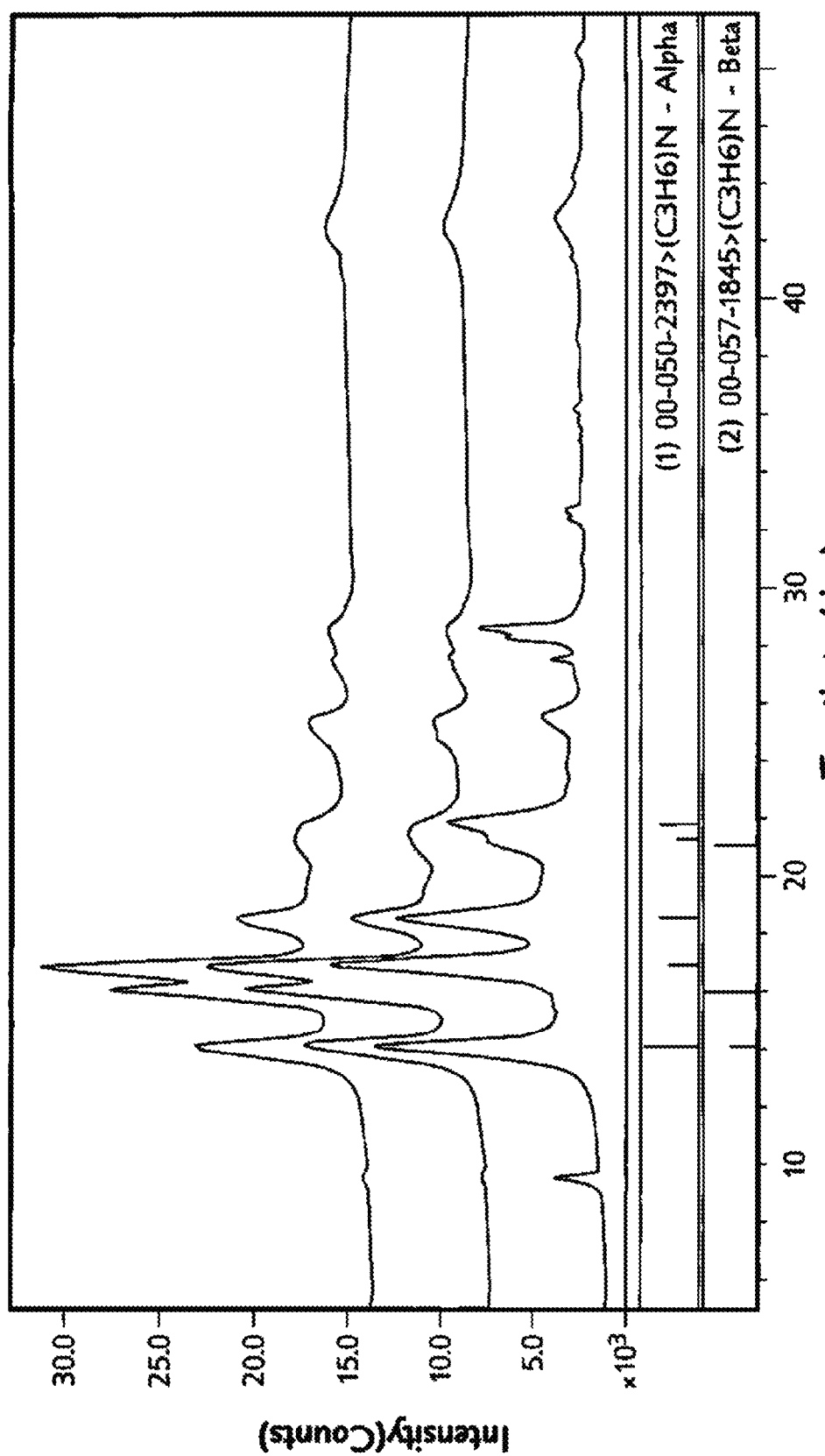
FIG. 6 shows the phase identification for three samples: Top trace—WAXD pattern for Extra talc Sample #1, InET surface showing presence of beta-crystalline phase peak at 16.1°; Middle trace—WAXD pattern for Extra talc Sample #2, InET surface showing presence of beta-crystalline phase peak at 16.1°; Bottom trace—WAXD pattern for Sample
}

Differential scanning calorimetry (DSC) also unexpectedly revealed that, for all exemplary cup formulations described herein (Cups 1-6), beta-crystallinity is absent from the DSC $2^{nd}$ heat curve (FIG. 4), but could be identified via wide angle X-ray diffraction (FIGS. 5-6). For conventional polypropylene-based foams known to those skilled in the art, beta-crystallinity identified by X-ray wide angle diffraction would lead to an expectation of beta-crystallinity also being identified by differential scanning calorimetry. Thus, a feature of an insulative cellular polypropylene-based material in accordance with the present disclosure is beta-crystallinity that is identifiable by wide angle X-ray diffraction, but not by differential scanning calorimetry.

Furthermore, conventional polypropylene-based foam might be expected to contain alpha- and beta-crystalline phases detectable by wide angle X-ray diffraction. However, the extra peak present at 16.1° in the wide angle X-ray diffraction patterns for all exemplary insulative cellular polypropylene materials described herein (see, FIGS. 5-6), which peak may be attributed to the presence of the beta-crystalline phase of polypropylene, i.e., the beta-polymorph, or more specifically, to the diffraction of crystal reflections from the β(300) plane, is noticeably absent in the wide angle X-ray diffraction pattern of a sample of conventional polypropylene-based foam (Sample B in FIG. 6). Thus, whereas conventional polypropylene-based foam appears to include pure alpha-crystalline phase, the insulative cellular polypropylene-based material of the present disclosure includes a mixture of alpha- and beta-crystalline phases.

It was found unexpectedly that the OET surface works favorably in a compression mode without causing appreciable creasing, and therefore that an insulative cup (or other structure) may be made with the OET surface facing inside of the insulative cup. In an exemplary embodiment, a crease of about 200 microns deep was seen as a fold where the cell wall collapsed under the compression forces when the InET surface faces inside of the insulative cup (see FIG. 2 and FIG. 3). The difference in the resistance of the InET layer and the OET layer to compression force may be due to difference in the morphology of the layers because they were crystallized at different cooling rates. Interestingly, however, microscopy revealed that cell size appearance in layers close to the surface appears to be the same for InET and OET, nor is there any difference detected between InET and OET by differential scanning calorimetry.

In exemplary embodiments of formation of an extruded sheet of insulative cellular polypropylene-based material, the InET surface may be cooled by a combination of water cooling and compressed air. The OET surface may be cooled by compressed air by using a torpedo with circulating water and air outlet. Faster cooling may result in the formation of smaller size crystals. Typically, the higher the cooling rate, the greater the relative amount of smaller crystals that are formed. X-Ray diffraction analysis of an exemplary extruded sheet of insulative cellular polypropylene-based material was conducted on Panalytical X'pert MPD Pro diffractometer using Cu radiation at 45 KV/40 mA. It was confirmed that, while the degree of crystallinity is the same for InET and OET, the OET surface had smallest alpha-domain size of about 99 Å, highest beta-domain size (231 Å) and K-value of 28, while the InET surface compared to OET surface had a larger alpha-domain size of about 121 Å, smaller beta-domain size of 183 Å and higher content of beta-domain as seen from the K-value of 37. (see, Table 3 from Examples 1-5). Without wishing to be bound by theory, it is believed that a higher cooling rate for the OET surface influenced a crystal domain size therein, which, as a result enables the OET surface due to its unique morphology to better withstand a compression force without irreversible deformation.

The most direct evidence of partially crystalline structure of polymers is provided by X-ray diffraction studies. There is a close relation between regularity of molecular structure and ability of polymer to crystallize. The term lamellae refers to a structure described as single polymer crystal. Lamellae of different polymers have the same general appearance, being composed of thin, flat platelets about 100 Å thick and often many microns in lateral dimensions. The thickness of the lamellae depends on crystallization temperature and any subsequent annealing treatment. Since the molecules comprising the polymers are at least 1000 Å long and the lamellae are only about 100 Å thick, the only plausible explanation is that the polymer chains are folded. Fringed micelle models or fringe crystalline models of the structures of polymer crystals formed from melts states that polymer chains are precisely aligned over distances corresponding to dimensions of the crystallites, but indicate more disordered segments of amorphous regions around them.

The defect structure of highly crystalline polymers is another theory used to describe X-ray diffraction patterns from polymer crystals. Defect-crystal concept accounts for X-ray diffraction pattern broadening due to (1) point defects, such as vacant sites and polymer chain ends, (2) dislocations of polymer edges, (3) two-dimensional imperfections in fold surfaces, (4) chain-disorder defects, and (5) amorphous defects. While all listed factors contribute in part to X-ray line broadening, it is not known exactly how large such an impact is for every specific polymer. For all practical purposes of comparing and ranking one polymer structure versus another in terms of larger or smaller crystal domain size, wide-angle X-ray diffraction is commonly used. In wide-angle X-Ray diffraction, the final crystal domain size is obtained in units of Angstrom (Å).

For all practical purposes of ranking, measuring, and describing aspects of the present disclosure in terms of crystal domain size, wide angle X-ray scattering was used as the test method. In the present disclosure, the term crystal domain size means lamellae thickness, and the term X-Ray refers to wide-angle X-Ray diffraction.

In exemplary embodiments, an extruded strip of insulative cellular polypropylene-based material may have an alpha-domain size below about 200 Å, beta-domain size above 200 Å and K-value of 18 to 30. In exemplary embodiments, an extruded strip of insulative cellular polypropylene-based material may have an alpha-domain size preferably below about 115 Å, beta-domain size above 220 and K-values 25 to 28. In exemplary embodiments, an extruded strip of insulative cellular polypropylene-based material may have a K-values of less than 30.

The present disclosure provides material characterized by the crystalline structure of the polypropylene foam to control morphology and the crease-resistant properties.

An insulative cellular polypropylene-based material of the present disclosure satisfies a need for a material that can be formed into an article, such as an insulative cup, that includes the features of wrinkle-resistance and crease-resistance as described herein, as well as many, if not all, of the features of insulative performance, recyclability, puncture resistance, frangibility resistance, and microwaveability, which features are described in U.S. patent application Ser. Nos. 13/491,007 and 13/491,327 both of which are incorporated herein by reference in their entirety. Such polymeric material has an alpha phase and beta phase detectable by X-ray analysis, but with only alpha-phase identifiable by DSC.

In exemplary embodiments, a formulation includes at least two polymeric materials. In one exemplary embodiment, a primary or base polymer comprises a high melt strength polypropylene that has long chain branching. In one exemplary embodiment, the polymeric material also has non-uniform dispersity. Long chain branching occurs by the replacement of a substituent, e.g., a hydrogen atom, on a monomer subunit, by another covalently bonded chain of that polymer, or, in the case of a graft copolymer, by a chain of another type. For example, chain transfer reactions during polymerization could cause branching of the polymer. Long chain branching is branching with side polymer chain lengths longer than the average critical entanglement distance of a linear polymer chain. Long chain branching is generally understood to include polymer chains with at least 20 carbon atoms depending on specific monomer structure used for polymerization. Another example of branching is by crosslinking of the polymer after polymerization is complete. Some long chain branch polymers are formed without crosslinking. Polymer chain branching can have a significant impact on material properties.

In illustrative embodiments, a polymeric material includes a primary base resin. In illustrative embodiments, a base resin may polypropylene. In illustrative embodiments, an insulative cellular non-aromatic polymeric material comprises a polypropylene base resin having a high melt strength, a polypropylene copolymer or homopolymer (or both). In an embodiment, a formulation of the polymeric material comprises about 50 to about 100 wt % of the primary base resin. Suitably, a formulation comprises about 70 to about 100 wt % of a primary base resin. Suitably, a formulation comprises about 50 to about 99 wt % of a primary base resin. Suitably, a formulation comprises about 50 to about 95 wt % of a primary base resin. Suitably, a formulation comprises about 50 to about 85 wt % of a primary base resin. Suitably, a formulation comprises about 55 to about 85 wt % of the primary base resin. As defined hereinbefore, any suitable primary base resin may be used. One illustrative example of a suitable polypropylene base resin is DAPLOY™ WB140 homopolymer (available from Borealis A/S), a high melt strength structural isomeric modified polypropylene homopolymer (melt strength=36, as tested per ISO 16790 which is incorporated by reference herein, melting temperature=325.4° F. (163° C.) using ISO 11357

In illustrative embodiments, a polymeric material includes a polypropylene copolymer or homopolymer (or both). In another embodiment, a polymeric material comprises about 0 to about 50 wt % of a secondary resin. In an embodiment, a polymeric material comprises about 0 to about 50 wt % of a secondary resin. In an embodiment, a polymeric material comprises about 0 to about 50 wt % of a secondary resin. In an embodiment, a polymeric material does not have a secondary resin. In a particular embodiment, a secondary resin can be a high crystalline polypropylene homopolymer, such as F020HC (available from Braskem), and PP 527K (available from Sabic).

In exemplary embodiments, a secondary resin may be or may include polyethylene. In exemplary embodiments, a secondary resin may include low density polyethylene, linear low density polyethylene, high density polyethylene, ethylene-vinyl acetate copolymers, ethylene-ethylacrylate copolymers, ethylene-acrylic acid copolymers, polymethylmethacrylate mixtures of at least two of the foregoing and the like.

The polymer resins may be blended with any additional desired components and melted to form a resin formulation.

In one aspect of the present disclosure, at least one slip agent may be incorporated into a formulation of the polymeric material to aid in increasing production rates. A slip agent (also known as a process aid) is a term used to describe a general class of materials which are added to a resin mixture and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated $C_{18}$) through erucyl ($C_{22}$ single unsaturated) may be used. Other representative examples of slip agent materials include low molecular weight amides and fluoroelastomers. Combinations of two or more slip agents can be used. Slip agents may be provided in a master batch pellet form and blended with the resin formulation.

In another embodiment, a formulation comprises about 0 to about 10 wt % of a slip agent. In an embodiment, a formulation comprises about 0 to about 5 wt % of a slip agent. In a further embodiment, a formulation comprises about 0 to about 3 wt % of a slip agent. Any suitable slip agent may be used. In a particular embodiment, a slip agent is the linear low-density polyethylene, Ampacet™ 102823.

In another embodiment, a formulation comprises about 0 to about 10 wt % of a colorant. In an embodiment, a formulation comprises about 0 to about 5 wt % of a colorant. In a further embodiment, a formulation comprises about 0 to about 3 wt % of a colorant. In another embodiment, a formulation comprises about 0.5 to about 1.5 wt % of a colorant. Any suitable colorant may be used. In a particular embodiment, a colorant is $TiO_2$.

One or more nucleating agents are used to provide and control nucleation sites to promote formation of cells, bubbles, or voids in the molten resin during the extrusion process. A nucleating agent refers to a chemical or physical material that provides sites for cells to form in a molten resin mixture. Nucleating agents may be physical agents or chemical agents. Suitable physical nucleating agents have desirable particle size, aspect ratio, and top-cut properties, shape, and surface compatibility. Examples include, but are not limited to, talc, $CaCO_3$, mica, kaolin clay, chitin, aluminosilicates, graphite, cellulose, and mixtures of at least two of the foregoing. A nucleating agent may be blended with the polymer resin formulation that is introduced into the hopper. Alternatively, a nucleating agent may be added to a molten resin mixture in an extruder. When the chemical reaction temperature is reached the nucleating agent acts to enable formation of bubbles that create cells in the molten resin. An illustrative example of a chemical blowing agent is citric acid or a citric acid-based material. After decomposition, a chemical blowing agent forms small gas cells which further serve as nucleation sites for larger cell growth from physical blowing agents or other types thereof. One representative example is Hydrocerol™ CF-40E™ (available from Clariant Corporation), which contains citric acid and a crystal nucleating agent. Another representative example is Hydrocerol™ CF-05E™ (available from Clariant Corporation), which contains citric acid and a crystal nucleating agent. In illustrative embodiments one or more catalysts or other reactants may be added to accelerate or facilitate the formation of cells.

In certain exemplary embodiments, one or more blowing agents may be incorporated. Blowing agent means a physical or a chemical material (or combination of materials) that acts to expand nucleation sites. Nucleating agents and blowing agents may work together. A blowing agent acts to reduce density by forming cells in the molten resin. A blowing agent may be added to the molten resin mixture in the extruder. Representative examples of physical blowing agents include, but are not limited to, carbon dioxide, nitrogen, helium, argon, air, water vapor, pentane, butane, or other alkane mixtures of the foregoing and the like. In certain exemplary embodiments, a processing aid may be employed that enhances the solubility of the physical blowing agent. Alternatively, a physical blowing agent may be a hydrofluorocarbon, such as 1,1,1,2-tetrafluoroethane, also known as R134a, a hydrofluoroolefin, such as, but not limited to, 1,3,3,3-tetrafluoropropene, also known as HFO-1234ze, or other haloalkane or haloalkane refrigerant. Selection of a blowing agent may be made to take environmental impact into consideration.

In exemplary embodiments, physical blowing agents are typically gases that are introduced as liquids under pressure into a molten resin via a port in an extruder. As the molten resin passes through the extruder and the die head, the pressure drops causing the physical blowing agent to change phase from a liquid to a gas, thereby creating cells in the extruded resin. Excess gas blows off after extrusion with the remaining gas being trapped in the cells in the extrudate.

Chemical blowing agents are materials that degrade or react to produce a gas. Chemical blowing agents may be endothermic or exothermic. Chemical blowing agents typically degrade at a certain temperature to decompose and release gas. In one aspect a chemical blowing agent may be one or more materials selected from the group consisting of azodicarbonamide; azodiisobutyro-nitrile; benzenesulfon-hydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; and p-toluene sulfonyl azide.

In one aspect of the present disclosure, where a chemical blowing agent is used, a chemical blowing agent may be introduced into a resin formulation that is added to a hopper.

In one aspect of the present disclosure, a blowing agent may be a decomposable material that forms a gas upon decomposition. A representative example of such a material is citric acid or a citric-acid based material. In one exemplary aspect of the present disclosure it may be possible to use a mixture of physical and chemical blowing agents.

In another embodiment, a formulation comprises about 0 to about 20 wt % of a nucleating agent. In an embodiment, a formulation comprises about 0 to about 10 wt % of a nucleating agent. In another embodiment, a formulation comprises about 0 to about 5 wt % of a nucleating agent. In another embodiment, a formulation comprises about 0.1 to about 2.5 wt % of a nucleating agent. In an embodiment, a formulation comprises about 0.35 to about 1.5 wt % of a nucleating agent. Any suitable nucleating agent or nucleating agents may be used. In a particular embodiment, the nucleating agent is selected from the group consisting of Hydrocerol™ CF-40E™ (available from Clariant Corporation), HPR-803i fibers (available from Milliken), talc, and mixtures thereof.

In another embodiment, a nucleating agent comprises a primary nucleating agent and a secondary nucleating agent. In an embodiment, a formulation comprises about 0.01 to about 10 wt % of a primary nucleating agent. In an embodiment, a formulation comprises about 0.01 to about 5 wt % of a primary nucleating agent. In an embodiment, a formulation comprises about 0.01 to about 0.15 wt % of a primary nucleating agent. In an embodiment, a formulation comprises about 0.02 to about 0.1 wt % of a primary nucleating agent. In an embodiment, a formulation comprises about 0.03 to about 0.7 wt % of a primary nucleating agent. Any suitable primary nucleating agent may be used. A primary nucleating agent may be defined as a chemical blowing agent or chemical foaming agent, itself comprising a nucleating agent. In a particular embodiment, a primary nucleating agent is Hydrocerol™ CF-40E™ (available from Clariant Corporation).

In an embodiment, a formulation comprises about 0.01 to about 10 wt % of a secondary nucleating agent. In an embodiment, a formulation comprises about 0.01 to about 5 wt % of the secondary nucleating agent. In an embodiment, a formulation comprises about 0.1 to about 2.2 wt % of a secondary nucleating agent. In an embodiment, a formulation comprises about 0.3 to about 1.7 wt % of a secondary nucleating agent. In an embodiment, a formulation comprises about 0.4 to about 1.5 wt % of a secondary nucleating agent. In an embodiment, a formulation comprises about 0.45 to about 1.25 wt % of a secondary nucleating agent. Any suitable secondary nucleating agent may be used. In a particular embodiment, a secondary nucleating agent is from HPR-803i fibers (available from Milliken) or talc.

Formulations described herein can be used to form insulative, polymeric containers. In an embodiment, a container can be a cup. In an embodiment, a container can be a microwaveable tray.

EXAMPLES

The following examples are set forth for purposes of illustration only. Parts and percentages appearing in such examples are by weight unless otherwise stipulated.

Example 1: Sample Cup Formulation and Extrusion

An exemplary formulation used to illustrate the present disclosure is presented below and is described in U.S. patent application Ser. No. 13/491,327, filed Jun. 7, 2012 and entitled POLYMERIC MATERIAL FOR AN INSULATED CONTAINER, the disclosure of which is hereby incorporated herein by reference in its entirety:

DAPLOY™ WB140 high melt strength polypropylene homopolymer (available from Borealis A/S) was used as the primary base resin. F020HC, available from Braskem, a polypropylene homopolymer resin, was used as the secondary resin. The two resins were blended with: Hydrocerol™ CF-40E™ as a primary nucleation agent, talc as a secondary nucleation agent, $CO_2$ as a blowing agent, a slip agent, and titanium dioxide as a colorant. Formulation 1 was the following:

| | |
|---|---|
| 80.7% | Primary resin: high melt strength polypropylene Borealis WB140 HMS |
| 15.0% | Secondary resin: F020HC (Braskem) |
| 0.05% | Chemical blowing agent Clariant Hydrocerol ™ CF-40E ™ |
| 0.25% | Nucleating agent: Talc |
| 2.0% | Colorant: $TiO_2$ PE (alternatively, PP can be used) |
| 2.0% | Slip agent: Ampacet ™ 102823 LLDPE (linear low-density polyethylene), available from Ampacet Corporation |

The formulation described above was added to an extruder hopper. The extruder heated the formulation to form a molten resin mixture. To this mixture was added 3.4 lbs/hr $CO_2$, which was injected into the resin blend to expand the resin and reduce density. The mixture thus formed was extruded through a die head into a sheet. The sheet was then die-cut and formed into a cup as described in U.S. patent application Ser. No. 13/491,007, filed Jun. 7, 2012 and entitled INSULATED CONTAINER, the disclosure of which is hereby incorporated herein by reference in its entirety.

Example 2: Sample Cup Preparations

Cup 1

Figure 3:
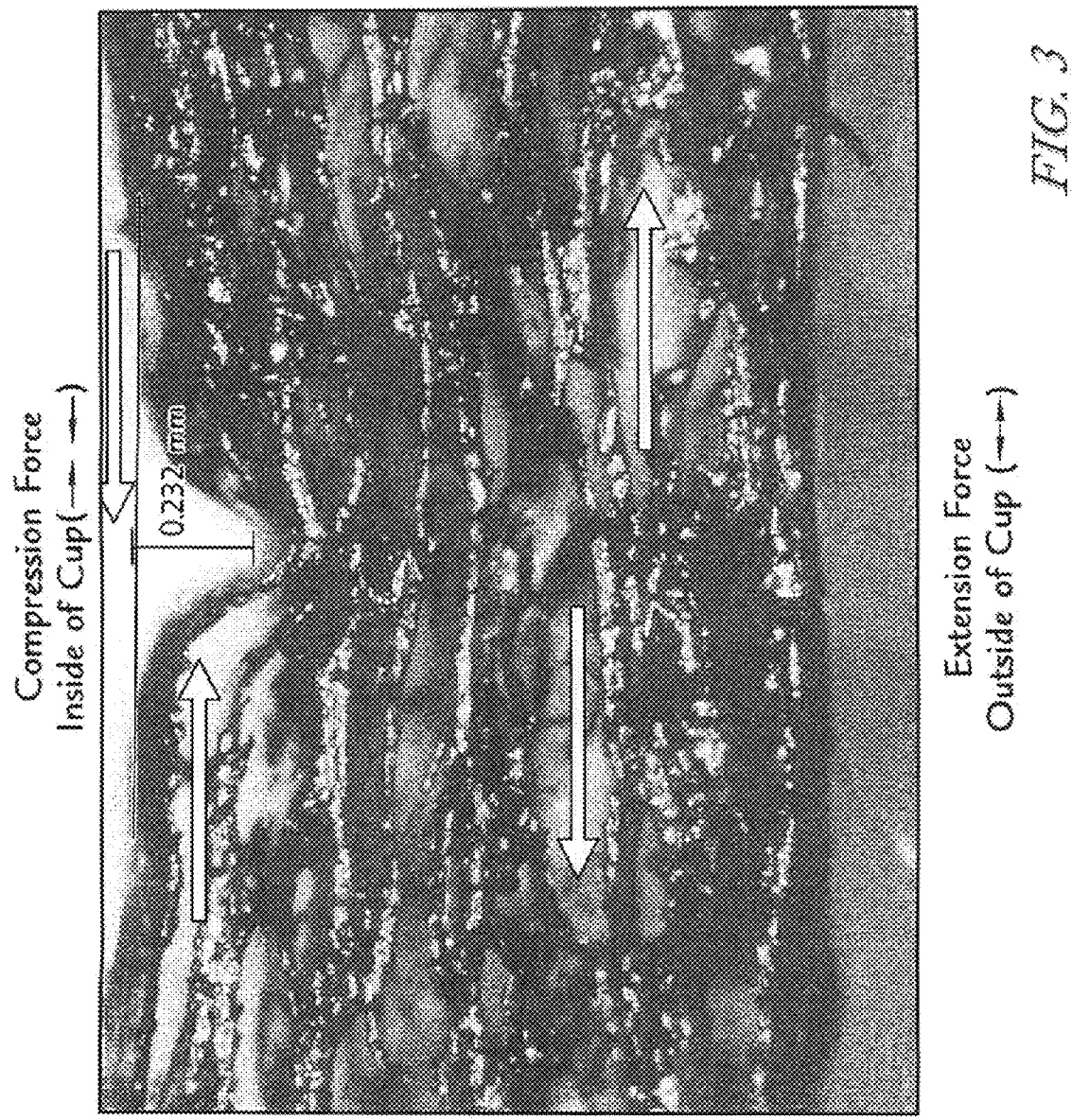
FIG. 3 shows a View A microscopy image of the insulative cup side wall from the insulative cup of Example 1 (without laminated printed film and with black marker used to eliminate light reflection for clearer image), where OET is outside of the insulative cup, again illustrating that creasing/deep wrinkles formed on the inside of the insulative cup in the same way as in FIG. 2/Example 5.
Figure 4:
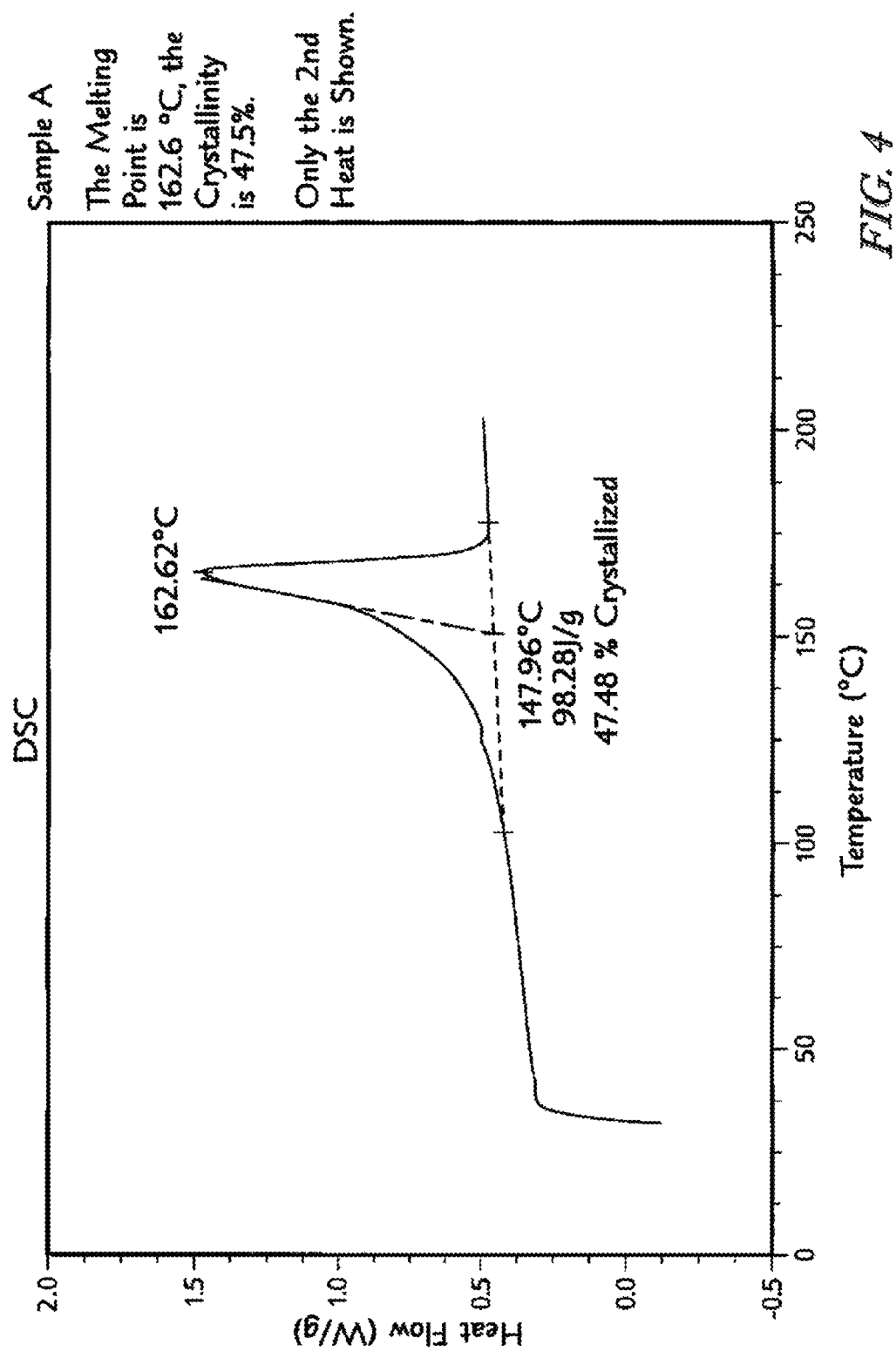
FIG. 4 shows a differential scanning calorimetry (DSC) graph in which a beta-crystalline phase (i.e., beta-crystallinity) is not detected during a $2^{nd}$ heat scan for an insulative cellular polypropylene-based material of the present disclosure.

Insulative cellular polypropylene-based material was extruded with the formulation described above. Die-cut article shapes were oriented in the MD (machine direction) with the longer side of the article oriented along the web direction. Insulated cups were formed with OET facing outside of the insulated cup resulting in multiple creases and wrinkles, some deeper than 5 mm. FIG. 3 shows a microscopy image of the foam cell wall collapsed forming a crease during article formation. The insulated cups were not usable.

Cup 2

The same insulative cellular polypropylene-based material as in Cup 1 was used to make die cut shapes in MD direction, but articles were formed with OET facing inside the insulative cup. Unexpectedly, the insulative cup surface was free of creases and the insulative cups were acceptable for use.

Cup 3

The same insulative cellular polypropylene-based material as in Cup 1 was used to make die cut shapes in CD (cross-web direction), with the longer side of the article oriented across the web. Insulative cups were formed with OET facing outside of the insulative cup. Appearance further improved compared to Cup 2. The insulative cups were usable.

Cup 4

The same insulative cellular polypropylene-based material as in Cup 1 was used to make die cut shapes in CD, with the longer side of the article oriented across the web. Insulative cups were formed with OET tube facing inside of the insulative cup. Appearance further improved compared to Example 2. The insulative cups were usable and had no creases.

Cup 5

Printed polypropylene (PP) film was laminated to the OET layer of the insulative cellular polypropylene-based material of Example 1, the article shape was die cut in MD, and insulated cups were formed with printed layer facing outside of the insulated cup. Appearance was the worst, with creases exceeding 5 mm depth.

Cup 6

Printed polypropylene (PP) film was laminated to the OET layer of the insulative cellular polypropylene-based material of Example 1, the article shape was die cut in CD, and insulated cups were formed with printed layer facing outside of the insulated cup. Appearance improved compared to Example 5, but did not compare favorably with Cups 2, 3, and 4.

TABLE 2

Test Results for Sample Cups 1-6

| Sample ID | Direction the shape was cut | Outside of extruded tube (OET) surface location on the formed cup | Visual appearance | Appearance scale (1—bad, 5—excellent) |
|---|---|---|---|---|
| Cup 1 (insulative cellular polypropylene-based material only) | MD | OET - OUTSIDE the cup | Multiple bad creases | 2 |

TABLE 2-continued

Test Results for Sample Cups 1-6

| Sample ID | Direction the shape was cut | Outside of extruded tube (OET) surface location on the formed cup | Visual appearance | Appearance scale (1—bad, 5—excellent) |
|---|---|---|---|---|
| Cup 2 (insulative cellular polypropylene-based material only) | MD | OET - INSIDE the cup | No creases | 4 |
| Cup 3 (insulative cellular polypropylene-based material only) | CD | OET - OUTSIDE the cup | No creases | 4 |
| Cup 4 (insulative cellular polypropylene-based material only) | CD | OET - INSIDE the cup | Smooth inside surface, no creases | 5 |
| Cup 5 (with printed PP film on OET side) | MD | Printed PP film on OET - OUTSIDE the cup | Deep creases from top to bottom of the cup | 1 |
| Cup 6 (with printed PP film on OET side) | CD | Printed PP film on OET - OUTSIDE the cup | Two creases: one along the seam, another opposite to the seam | 3 |

The cup-forming process that best minimized wrinkling and/or creasing (Cup 4) included a step of cutting the shape in a cross-web direction (CD) from an extruded tube of insulative cellular polypropylene-based material with the OET surface/layer facing the inside of the cup. When (a) the cup shape was cut out in the CD and (b) the cup was obtained from laminating a printed polypropylene film to OET surface/layer facing the outside of the cup as in Cup 6, there was significant improvement in visual appearance. When (a) the shape was cut in the CD and (b) the printed polypropylene film was laminated to InET surface/layer, the appearance and rim shape further improved compared to Cup 6.

As evident from microscopy images (FIG. 2 and FIG. 3), the cup is folded under a compressive force when the InET is the inside of a cup, resulting in wrinkles and creases. Unexpectedly, the OET as the inside of a cup does not fold. The OET can withstand a compressive force, despite the fact that there is no difference detected between InET and OET by differential scanning calorimetry. Further, cell size in layers close to the surface appears to be the same for InET and OET as confirmed by microscopy.

The difference between InET and OET was investigated by wide angle X-Ray diffraction (WAXD) analysis. WAXD analysis was conducted as follows: A sample section with a size of 1"×1" fixed in a standard sample holder was placed into a Panalytical X'pert MPD Pro diffractometer using Cu radiation at 45 KV/40 mA. Scans were run over the range of 5°-50° with a step size of 0.0157° and a counting time of 50 seconds per step. The diffraction patterns for the InET and OET surfaces of the sample were determined. The WAXD patterns of polypropylene exhibited five major peaks located at 14.2°, 16.1°, 17.1°, and 18.6°, corresponding to the diffraction of crystal reflections from the $\alpha(110)$, $\beta(300)$, $\alpha(040)$, $\alpha(130)$, and $\gamma(117)$ planes, respectively. The $\alpha(110)$ peak was used to calculate the crystal domain size as shown at FIG. 5A.

The K-value was calculated using RIR method (Reference Intensity Ratio) to characterize the relative content of the beta-phase in the material in accordance to the following formula:

$$K \text{ value} = (A_\beta/(A_\alpha + A_\beta)) \times 100,$$

where the K value is the content of beta domain expressed as a percent (%);

$A_\alpha$ is total area of the alpha-domain peak on WAXD pattern graph corresponding to the diffraction of crystal reflections from the $\alpha(110)$ plane;

$A_\beta$ is the total area of the beta-domain peak on WAXD pattern graph corresponding to the diffraction of crystal reflections from the $\beta(300)$ plane.

Although the degree (percent) of crystallinity was the same for InET and OET, the size of the crystalline domains was different (Table 3). This size difference may have been due to a differential rate of cooling which afforded a crystalline structure in the OET better able to withstand a compressive force without irreversible deformation. Without being bound by theory, the difference in the surface morphology and crystalline structure between the OET and InET may have be an important factor in the occurrence of creasing and/or wrinkling

TABLE 3

X-Ray Data Summary for Sample Cups 1-6

| Sample ID | Domain Size, Å | | Percent Crystallinity, % (Determined by X-Ray) | % β-Phase = K-value * 100 |
|---|---|---|---|---|
| | α-Phase | β-Phase | | |
| Cups 1-5 InET | 121 | 183 | 61 | 37 |
| Cups 1-5 OET | 99 | 231 | 58 | 28 |
| Extra talc[1] - Inner | 158 | 156 | 59 | 76 |
| Extra talc - Outer | 164 | 169 | 57 | 77 |
| Sample B[2] - Inner | 145 | Not Present | 61 | Not Applicable |
| Sample B - Outer | 152 | Not Present | 59 | Not Applicable |

[1]Extra talc = Cup of formula 5
[2]Sample B = Commercially available polypropylene cup Crystalline domain size was sensitive to material formulation. As shown in Table 3, the alpha-phase crystal domain size for a sample with extra talc (2% talc) that exhibited creasing came out to be very large, i.e., 158 Å for InET and 164 Å for OET, compared to the smaller alpha-phase crystal domain size for OET of Cups 1-5, which was measured at 99 Å. The InET surface of Cups 1-5 had an alpha-phase crystal domain size of 121 Å. Cell size, polypropylene melting point, crystallization temperature, and degree of crystallinity (measured by differential scanning calorimetry and X-Ray analysis) of InET and OET foam surface were similar.

The OET surface of Cups 1-4 had the optimal cup appearance when OET was facing inside of the cup and had the best resistance to compression forces during cup formation. These cups also had the following unique combination of features:

- smallest alpha-phase crystal domain size;
- largest beta-phase crystal domain size; and
- K-value below 30 (Table 3).

Differential scanning calorimetry (DSC) analysis was conducted on a TA Instruments DSC 2910 using heat-cool-heat, 10° C./min, under a nitrogen atmosphere. Differential scanning calorimetry unexpectedly revealed that, for all examples of cup formation described above, beta-crystallinity was absent from the DSC $2^{nd}$ heat curve (FIG. 4), but could be identified via X-ray wide angle diffraction. For known conventional polypropylene-based foams, beta-crystallinity identified by X-ray wide angle diffraction would lead to an expectation of beta-crystallinity also being identified by differential scanning calorimetry. Thus, a feature of an insulative cellular polypropylene-based material in accordance with the present disclosure includes beta-crystallinity that is identifiable by wide angle X-ray diffraction but not by differential scanning calorimetry.

The beta-phase content (231 Å) was highest for the material that resulted in best performance (Table 3). Further study was conducted on the samples with comparable alpha domain size and comparable beta-phase domain size (all above 200 Å) and variable content of beta-phase as described by K-values. Unexpectedly, the relationship between the K-value and the ability to form a high surface quality cup without wrinkles was not proportional. There was a region of optimal K-values that resulted in excellent PP foam surface. The best cup appearance corresponded to the K-values ranging from 18 to 30, more preferably from 22 to 28.

TABLE 4

| Formulation | Crystal Domain Size, Å | | Crystallinity, % | K Value, ratio | Visual appearance | Appearance scale (1 - bad, 5 - excellent) |
|---|---|---|---|---|---|---|
| | α-Phase | β-Phase | | | | |
| 2 | 152 | 207 | 62 | 9 | Deep creases, cup is not usable | 1 |
| 3 | 138 | 235 | 57 | 11 | Rough surface, cup is not usable | 1 |
| 4 | 142 | 205 | 56 | 15 | Rough surface, cup is not usable | 1 |
| 2 | 130 | 236 | 59 | 17 | Creases, cup is not usable | 2 |
| 2 | 149 | 230 | 58 | 25 | Good quality cup, smooth surface | 3-4 |
| 2 | 150 | 245 | 57 | 23 | Best quality cup, smooth surface | 4-5 |
| 1 | 99 | 231 | 58 | 28 | Good cup quality, smooth surface | 4 |
| 1 | 121 | 183 | 61 | 37 | Creases, cup is not usable | 2 |
| 5 | 158 | 156 | 59 | 77 | Creases, cup is not usable | 1 |
| 5 | 164 | 169 | 57 | 77 | Creases, cup is not usable | 1 |

Formulation 2:

| | |
|---|---|
| 81.45% | Primary resin: high melt strength polypropylene Borealis WB140 HMS |
| 15.0% | Secondary resin: F020HC (Braskem) |
| 0.05% | Chemical blowing agent Clariant Hydrocerol ™ CF-40E ™ |
| 0.5% | Nucleating agent: Talc |
| 1.0% | Colorant: Colortech 11933-19 TiO$_2$-PP |
| 2.0% | Slip agent: Ampacet ™ 102823 |

| | |
|---|---|
| 81.45% | Primary resin: high melt strength polypropylene Borealis WB140 HMS |
| 15.0% | Secondary resin: F020HC (Braskem) |
| 0.05% | Chemical blowing agent Clariant Hydrocerol ™ CF-40E ™ |
| 0.5% | Nucleating agent: Techmer PPM 16464 Silica |
| 1.0% | Colorant: Colortech 11933-19 TiO$_2$-PP |
| 2.0% | Slip agent: Ampacet ™ 102823 |

| | |
|---|---|
| 81.45% | Primary resin: high melt strength polypropylene Borealis WB140 HMS |
| 15.0% | Secondary resin: F020HC (Braskem) |
| 0.05% | Chemical blowing agent Clariant Hydrocerol ™ CF-40E ™ |
| 0.5% | Nucleating agent: Talc |
| 1.0% | Colorant: Colortech 11933-19 TiO$_2$-PP |
| 2.0% | Slip agent: Ampacet ™ 102823 |

| | |
|---|---|
| 78.96% | Primary resin: high melt strength polypropylene Borealis WB140 HMS |
| 14.99% | Secondary resin: F020HC (Braskem) |
| 0.05% | Chemical blowing agent Clariant Hydrocerol ™ CF-40E ™ |
| 2.0% | Nucleating agent: Talc |
| 1.0% | Colorant: Colortech 11933-19 TiO$_2$-PP |
| 3.0% | Slip agent: Ampacet ™ 102823 |

Crystal domain size of alpha-phase and beta-phase varied for the samples in Table 4, however there was an optimal K-values range of from about 20 to about 30 which corresponded to a best cup surface quality.

Example 3: Cell Density and Dimension Morphology

A study of foam cell morphology provided insight into the ability to form wrinkle- and crease-resistant insulative cellular polypropylene-based material. Wrinkle- and crease-resistance refers to lack of wrinkle formation and/or creasing during cup convolution or shaping of a sheet of insulative cellular polypropylene-based material.

Cell length and cell height were measured by scanning electron microscopy (SEM) for an extruded sheet of insulative cellular polypropylene-based material of the present disclosure (Sample A, using the formulation described above) and for a sheet of conventional polypropylene foam (Sample B). The microscopy image was evaluated visually, and representative cells were chosen for measurement of cell length and cell width. Such a method of cell size determination, based on measurements made at 3-10 points, was well known and is mostly used as a quality control tool in foam manufacturing. The purpose of the measurement was to find typical or average/representative cell size, not to provide cell size distribution. The aspect ratio was calculated by dividing cell length by cell width for the same specified direction (MD or CD).

Sample B (conventional foam) had a much higher MD cell aspect ratio than Sample A foam, i.e., the cells of Sample B were long and narrow (Table 4). Sample B foam also possessed an aspect ratio below 2.0 in the CD direction, which was consistent with the cells of Sample B foam being long and narrow. In contrast, cells of Sample A foam had a much lower MD cell aspect ratio than cells of Sample B foam and an aspect ratio below 2.0 in the CD direction, thus indicative of cells with a more round shape.

TABLE 5

| | Cell Aspect Ratios | | |
|---|---|---|---|
| | Cell dimensions, mm | Sample B | Sample A |
| MD | Cell length | 1.19 | 0.92 |
| | Cell width | 0.12 | 0.26 |
| | MD Cell Aspect Ratio | 9.92 | 3.54 |
| CD | Cell length | 0.30 | 0.52 |
| | Cell width | 0.20 | 0.27 |
| | CD Cell Aspect Ratio | 1.50 | 1.93 |

A coefficient of anisotropy was calculated as a ratio of cell width (or height) in MD to the same parameter in opposite direction (CD). As shown in Table 5, Sample B foam was highly anisotropic. In contrast, Sample A was not much different in MD vs. CD, and therefore has low coefficient of anisotropy.

TABLE 6

| Coefficients of Anisotropy | | |
|---|---|---|
| Anisotropy Coefficient | Sample B | Sample A |
| MD cell length/CD cell length | 4.0 | 1.8 |
| MD cell width/CD cell width | 0.6 | 1.0 |

Wrinkling of a cellular material with a fixed chemical composition, made in the identical extrusion process with the same processing parameters, was eliminated when die cut parts were oriented in CD direction providing a cell aspect ratio close to 1 and a coefficient of anisotropy close to 1.

The invention claimed is:

1. An insulative container of cellular polymeric material comprising
an extruded sheet having an inside extrusion tube surface, an outside extrusion tube surface and an elongated shape die-cut in a cross direction and formed into a tubular container wall with the outside extrusion surface facing the inside of the tubular container wall, the cellular polymeric material comprising
a primary polypropylene resin, wherein beta-phase crystallinity is identifiable by wide angle X-ray diffraction and is not identifiable by differential scanning calorimetry.

2. The insulative cellular polymeric material of claim 1, further comprising a polypropylene secondary resin.

3. The insulative cellular polymeric material of claim 1, further comprising a slip agent.

4. The insulative cellular polymeric material of claim 1, further comprising at least one nucleating agent.

5. The insulative cellular polymeric material of claim 1, wherein a beta-phase crystallinity peak is present in the diffraction pattern from diffraction of crystal reflections from a $\beta(300)$plane.

6. An insulative container of cellular polymeric material comprising
an extruded sheet having an inside extrusion tube surface, an outside extrusion tube surface and an elongated die-cut shape formed into a tubular container wall with the outside extrusion surface facing the inside of the tubular container wall, the cellular polymeric material comprising
a primary polypropylene resin, wherein beta-phase crystallinity is identifiable by wide angle X-ray diffraction and is not identifiable by differential scanning calorimetry.

7. An insulative container of cellular polymeric material comprising
an extruded sheet having an inside extrusion tube surface, an outside extrusion tube surface and wherein the extruded sheet is formed into a tubular container wall with the outside extrusion surface facing the inside of the tubular container wall, the cellular polymeric material comprising
a primary polypropylene resin, wherein beta-phase crystallinity is identifiable by wide angle X-ray diffraction and is not identifiable by differential scanning calorimetry.

* * * * *